(12) United States Patent
Tamaoka

(10) Patent No.: US 7,866,047 B2
(45) Date of Patent: Jan. 11, 2011

(54) SLEEVE-UNIT MANUFACTURING METHOD

(75) Inventor: Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 1333 days.

(21) Appl. No.: 11/276,863

(22) Filed: Mar. 17, 2006

(65) Prior Publication Data

US 2006/0207098 A1 Sep. 21, 2006

(30) Foreign Application Priority Data

Mar. 18, 2005 (JP) ............................ 2005-078642
Mar. 18, 2005 (JP) ............................ 2005-078643
Dec. 15, 2005 (JP) ............................ 2005-361228

(51) Int. Cl.
*B23Q 23/00* (2006.01)
*B23P 17/00* (2006.01)
*B21K 1/04* (2006.01)
*B21K 1/10* (2006.01)

(52) U.S. Cl. .................. 29/898.07; 29/898; 29/898.09; 29/718

(58) Field of Classification Search .................. 29/598, 29/898, 898.02, 898.07, 898.09, 718, 724, 29/797, 795; 310/90, 40 R, 67 R; 360/99.08; 384/100, 107, 228, 279, 297, 114, 115
See application file for complete search history.

(56) References Cited

U.S. PATENT DOCUMENTS 3,619,888 A * 11/1971 Sawada et al. ................ 29/718
5,533,811 A 7/1996 Polch et al.
5,628,569 A 5/1997 Hayakawa et al.
5,659,445 A 8/1997 Yoshida et al.
6,456,458 B1 9/2002 Ichiyama
6,672,767 B2 1/2004 Hajota et al.
6,836,388 B2 12/2004 Nishimura et al.
6,857,189 B2 * 2/2005 Herndon et al. .......... 29/898.02
6,914,358 B2 7/2005 Tokunaga et al.
7,005,768 B2 2/2006 Tamaoka et al.
7,021,829 B2 4/2006 Tamaoka (Continued)

FOREIGN PATENT DOCUMENTS

JP 02-107705 A 4/1990

(Continued)

OTHER PUBLICATIONS

Tamaoka; "Sleeve, Sleeve Unity, Motor, and Method for Manufacturing Sleeve and Sleeve Unit"; U.S. Appl. No. 11/834,729, filed Aug. 7, 2007.

(Continued)

*Primary Examiner*—David P Bryant
*Assistant Examiner*—Alexander P Taousakis
(74) *Attorney, Agent, or Firm*—Keating & Bennett, LLP

(57) ABSTRACT

In the manufacture of a sleeve unit (22), when a sleeve (221) is to be glued to a sleeve housing (222), an endfaces (225) of the sleeve (221) while abutting on a sleeve retainer (51) is spring-biased along the center axis J1 in the direction toward the sleeve retainer (51). Meanwhile, an endface (226) on a side of the sleeve housing (222) opposite from the endface (225) of the sleeve (221) while abutting on a sleeve-housing retainer (52) is spring-biased along the center axis J1 in the direction toward the sleeve-housing retainer (52).

25 Claims, 12 Drawing Sheets

U.S. PATENT DOCUMENTS

| | | |
|---|---|---|
| 7,059,052 B2 | 6/2006 | Okamura et al. |
| 7,088,023 B1 * | 8/2006 | Gomyo et al. ................. 310/90 |
| 7,146,733 B2 * | 12/2006 | Yamashita et al. ....... 29/898.02 |
| 7,675,210 B2 * | 3/2010 | Maekawa et al. ............. 310/90 |
| 2002/0175577 A1 * | 11/2002 | Yoshitsugu et al. ........... 310/90 |
| 2003/0169952 A1 | 9/2003 | Yamashita et al. |
| 2003/0231813 A1 | 12/2003 | Gomyo et al. |
| 2004/0091187 A1 | 5/2004 | Aiello et al. |
| 2004/0145260 A1 | 7/2004 | Tamaoka et al. |
| 2004/0212921 A1 | 10/2004 | Herndon et al. |
| 2005/0025405 A1 | 2/2005 | Tamaoka |
| 2005/0069232 A1 | 3/2005 | Aiello et al. |
| 2006/0051001 A1 | 3/2006 | Nishimura et al. |
| 2006/0059689 A1 * | 3/2006 | Kagata et al. ............. 29/898.02 |
| 2006/0072242 A1 | 4/2006 | Tamaoka |

FOREIGN PATENT DOCUMENTS

| | | | |
|---|---|---|---|
| JP | 07-116490 | B2 | 12/1995 |
| JP | H08-007463 | A | 1/1996 |
| JP | 08-004230 | Y2 | 2/1996 |
| JP | 10-306827 | A | 11/1998 |
| JP | 2857304 | B2 | 2/1999 |
| JP | 2000-270512 | A | 9/2000 |
| JP | 2001-065552 | A | 3/2001 |
| JP | 2001-099141 | A | 4/2001 |
| JP | 2002-139029 | A | 5/2002 |
| JP | 2003-056555 | A | 2/2003 |
| JP | 2003-074543 | A | 3/2003 |
| JP | 2003-092867 | A | 3/2003 |
| JP | 2003-262217 | A | 9/2003 |
| JP | 2003-278758 | A | 10/2003 |
| JP | 3465204 | B2 | 11/2003 |
| JP | 2004-176816 | A | 6/2004 |
| JP | 2004-232651 | A | 8/2004 |
| JP | 2004-239387 | A | 8/2004 |
| JP | 2006-077872 | A | 3/2006 |
| JP | 2006-105237 | A | 4/2006 |

OTHER PUBLICATIONS

Tamaoka; "Sleeve Unit, Method of Manufacturing Thereof, and Motor Using the Sleeve Unit"; U.S. Appl. No. 11/857,520, filed Sep. 19, 2007.

\* cited by examiner

SLEEVE-UNIT MANUFACTURING METHOD

BACKGROUND OF THE INVENTION

1. Technical Field

The present invention is concerned with motors having a bearing mechanism, and with sleeve units for the motors, and in particular relates to technology for manufacturing such sleeve units.

2. Description of the Related Art

Recording-disk drives for storage devices such as hard disks are conventionally furnished with a spindle motor for rotationally driving the recording disk(s). (Such spindle motors will be referred to simply as "motors" hereinafter). One motor bearing mechanism that has been adopted in recent years is the hydrodynamic-pressure employing bearing mechanism. To employ hydrodynamic pressure, such bearing mechanisms are configured with thrust and radial bearing sections in between the motor shaft, and a sleeve into which the shaft is inserted.

In a publicly available example of such technology, a cylindrical housing attached to the outer periphery of a sleeve is anchored into a bracket, and a bearing mechanism employing oil dynamic pressure is constituted in between the sleeve and the housing (the two of which will together will be referred to as a "sleeve unit" hereinafter), and a rotor including a shaft that is inserted into the sleeve unit.

In attaching the sleeve housing to the sleeve in this sort of sleeve unit, in order to get the axial separation between the upper endface of the housing and the lower endface of the sleeve to meet the design specification for the separation, the two endfaces must be precisely aligned.

Further, in order to prevent the surfaces of the bearing-constituent sleeve from warping in manufacturing these sleeve units, ordinarily a slight interspace is left between the sleeve and the sleeve housing, and the sleeve is inserted into the housing and adhered to the housing via an adhesive.

With this method of manufacturing the sleeve units, inserting the sleeve into the sleeve housing leads to the adhesive being pushed out of the housing, running the risk that the adhesive will stick to sleeve, housing, bearing-thrust-plate and other surfaces where it is not needed, or end up contaminating the manufacturing jig.

Moreover because the gap between the sleeve and the shelve housing is extremely narrow, to prevent the sleeve and the housing from being damaged when the sleeve is inserted into the housing, the sleeve must be inserted smoothly without excess force being imparted to the sleeve.

BRIEF SUMMARY OF THE INVENTION

A method of manufacturing a sleeve unit in one example of the present invention comprises:

a) a step of retaining a sleeve shaped in essentially in the form of a cylinder centering on a center axis, and having on a first end portion of the sleeve along the center axis a first diametrically extending hydrodynamic bearing surface;

b) a step of retaining, with the center axis as center, an essentially cylindrical sleeve housing with a second end portion of the sleeve housing along the center axis being opposed to a third end portion of the sleeve along the center axis, the sleeve housing having on a fourth end portion thereof along the center axis a second diametrically extending hydrodynamic bearing surface;

c) a step of shifting, along the center axis, the sleeve relative to the sleeve housing to insert the sleeve into the sleeve housing, and making the center-axis-oriented separation between the first hydrodynamic bearing surface and the second hydrodynamic bearing surface be a predetermined distance; and d) a step, either simultaneous with or after said step c), of fixing the sleeve to the sleeve housing.

A method of manufacturing a sleeve unit in another example of the present invention comprises:

a) a step of applying an adhesive to an outer-side surface of a sleeve centering on a center axis, and/or to an inner-side surface of a sleeve housing, the sleeve housing inner-side surface centering on the center axis;

b) a step of retaining the sleeve;

c) a step of retaining the sleeve housing while opposing a second end portion, in the center-axis orientation, of the sleeve housing to a third end portion of the sleeve on a side thereof opposite, in the center-axis orientation, from the sleeve's first end portion;

d) a step of shifting, along the center axis, the sleeve relative to the sleeve housing to insert the sleeve into the sleeve housing through the other end portion of the sleeve housing, and of abutting the sleeve and the sleeve housing respectively against a first alignment member and a second alignment member, and meanwhile adhering the sleeve to the inner-side surface of the sleeve housing by means of the adhesive.

Further, in said step d), either the first end portion or the third end portion of the sleeve is, in addition to being abutted against the first alignment member, urged along the center axis in the direction toward the first alignment member, and a surface of the sleeve housing that faces in the direction, in terms of the center axis, opposite from the direction in which the urging force acts on the sleeve is, in addition to being abutted against the second alignment member, urged along the center axis in the direction toward the second alignment member.

The sleeve-unit manufacturing method in one example of the present invention allows the quality of a motor furnished with a sleeve unit—having a first hydrodynamic bearing surface on the sleeve, and a second hydrodynamic bearing surface on a side of the sleeve housing opposite the first hydrodynamic bearing surface—to be made consistent.

The sleeve-unit manufacturing method in a separate example of the present invention allows the sleeve unit to be manufactured with the sleeve appropriately adhered to the inner-side surface of sleeve housing, whereby the quality of a motor that includes the sleeve unit can be made consistent.

It should be understood that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated.

DETAILED DESCRIPTION OF THE INVENTION

Embodiment 1

Figure 1:
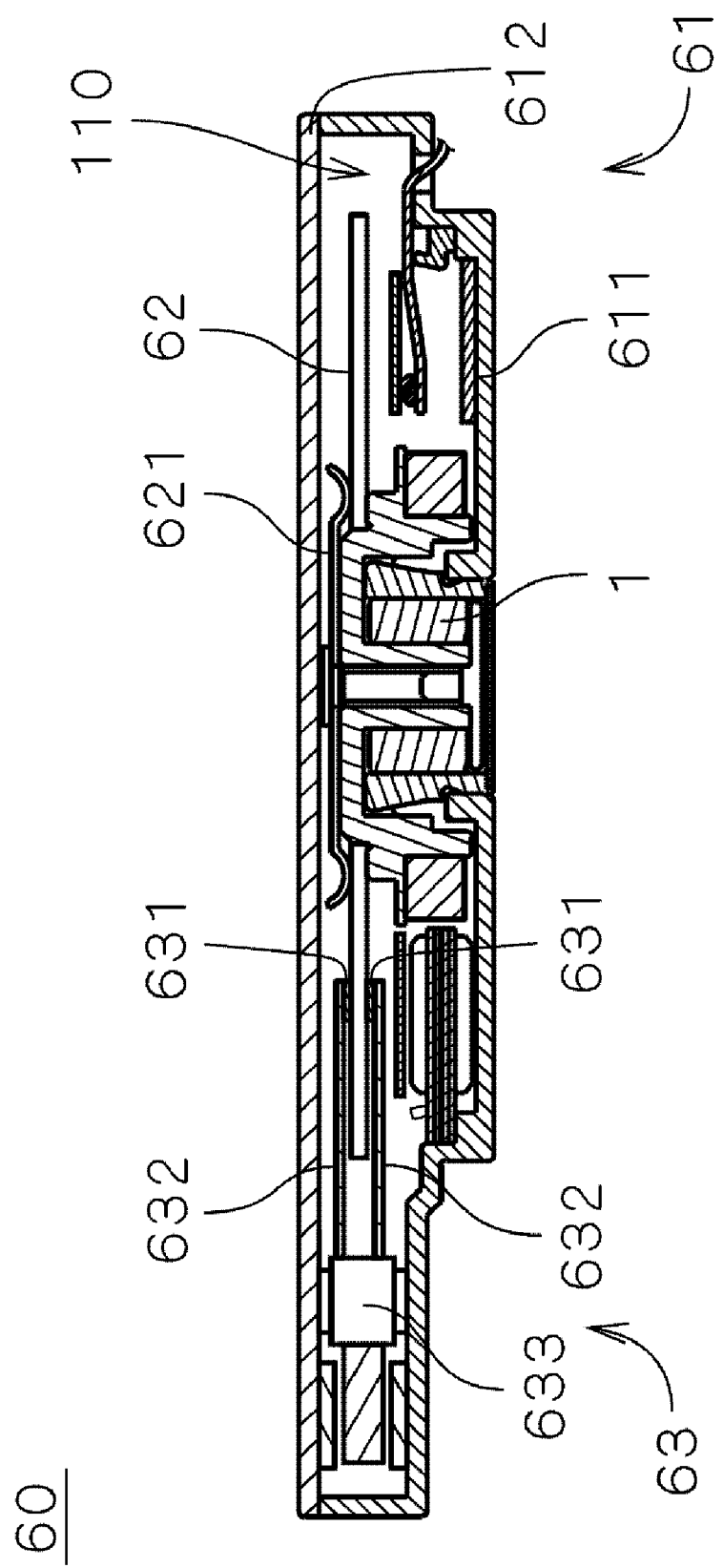
FIG. 1 is a diagram illustrating the internal configuration of a recording-disk drive device involving Embodiment 1 of the present invention.

Reference is made to FIG. 1, a diagram illustrating the internal configuration of a recording-disk drive device 60 furnished with an electrically powered spindle motor 1 (simply "motor 1" hereinafter) involving Embodiment 1 of the present invention. The recording-disk drive device 60 is a hard disk device, and is furnished with: a discoid recording disk 62 that records information; an access unit 63 that writes information onto and (or) reads information from the recording disk 62; the electric motor 1, which retains and spins the recording disk 62; and a housing 61 that in its interior space 110 accommodates the recording disk 62, the access unit 63, and the motor 1.

As illustrated in FIG. 1, the housing 61 has an opening in the upper portion thereof, and is furnished with a bottomed, cylindrical first housing component 611 to the undersurface of the inner side of which the motor 1 and the access unit 63 are attached, and a platelike second housing component 612 that by covering the opening in the first housing component 611 forms the interior space 110. In the recording-disk drive device 60, the housing 61 is formed by joining the second housing component 612 to the first housing component 611, wherein the interior space 110 is a clean chamber where dust and debris are extremely slight.

The recording disk 62 is set onto the upper end of the motor 1 and the fixed to it by a clamp 621. The access unit 62 includes heads 631 that adjoin the recording disk 62 for magnetically writing information onto and reading information from the disk, arms 632 that support the heads 631, and a head-shifting mechanism 633 that by shifting the arms 632 varies the position of the heads 631 relative to the recording disk 62. Through the configuration of these components, the heads 631 access required positions on, in a state in which the heads have been brought adjacent to, the spinning recording disk 62, to conduct the reading and writing of information onto the recording disk 62.

Figure 2:
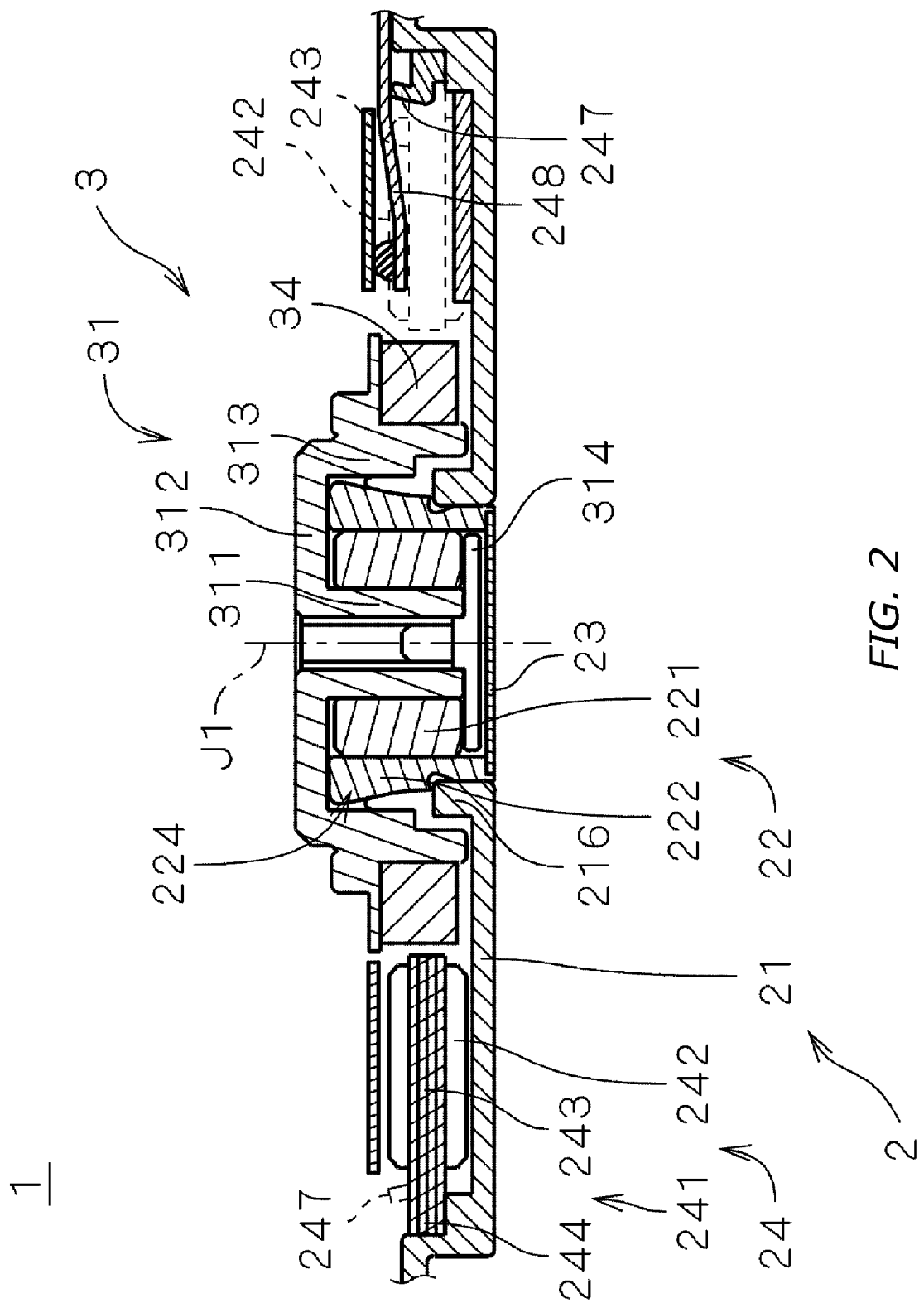
FIG. 2 is a vertical sectional view illustrating the configuration of the motor of FIG. 1.

The description now turns to FIG. 2, a vertical sectional view representing the configuration of the disk-driving motor 1. While a section in the plane containing the motor 1 center axis J1 (which is also the center axis of later-described sleeve unit 22) is illustrated in FIG. 2, by broken lines a portion of the configuration positioned deeper than the plane of the section is also depicted.

As indicated in FIG. 2, the motor 1 is furnished with a stator unit 2 and a rotor unit 3 via a bearing mechanism employing hydrodynamic pressure by the agency of a lubricating oil, the rotor unit 3 is supported rotatably on the stator unit 2, with the center axis J1 as center. For convenience in the following explanation, the rotor-section 3 side of the motor 1 will be described as the upper end and the stator 2 side as the lower end, but the center axis J1 need not necessarily coincide with the direction of gravity.

The rotor unit 3 is furnished with a rotor hub 31 that retains the different parts of the rotor unit 3, and a rotor magnet 34, disposed encircling the center axis J1, attached to the rotor hub 31. The rotor hub 31 is formed unitarily from stainless steel or other suitable metal, and is furnished with: a cylindroid shaft 311 that juts downward (i.e., toward the stator unit 2), centering on the center axis J1; a discoid circular plate section 312, flaring perpendicularly, with respect to the center axis J1, from the upper end portion of the shaft 311; and a cylindroid cylindrical section 313 that juts downward along the rim of the circular plate section 312. A discoid thrust plate 314 is attached to the tip-end portion of the shaft 311 at its lower side.

The stator unit 2 is furnished with: a baseplate 21—the base portion of the motor 1—that retains the different parts of the stator unit 2; a cylindroid sleeve unit 22 in which the shaft 311 of the rotor unit 3 is inserted and that is a portion of the bearing mechanism that rotatably supports the rotor unit 3; and along the compass of the sleeve unit 22, a stator 24 that is attached to the baseplate 21. The baseplate 21 is a portion of the first housing component 611 (cf. FIG. 1) and is formed unitarily with the remainder of the first housing component 611 by press-working an aluminum, aluminum-alloy, or magnetic or non-magnetic ferrous-metal sheet material. The stator 24, between itself and the rotor magnet 34 disposed encircling the shaft 311, generates rotational force (torque) centering on the center axis J1.

The stator 24 is attached along the upper side of the baseplate 21 by press-fitting or by an adhesive, and is furnished with a core 241 made by laminating a plurality of silicon steel plates, and with a plurality of coils 242 provided in predetermined locations on the core 241. The core 241 is furnished with a plurality of radially disposed teeth 243 with the center axis J1 as center, and with an annular support ring 244 that supports the plurality of teeth 243 along the outer circumferential side thereof (i.e., supports the plurality teeth 243 by linking the end portions of each of the teeth 243 on the side farther from the center axis J1). In each of the silicon steel plates that form the core 241, the portions that correspond respectively to the plurality of teeth 243 and to the support ring 244 are formed unitarily, by virtue of which the plurality of teeth 243 and the support ring 244 are magnetically connected.

The coils 242 are formed by winding a conductor onto the teeth 243 in multiple layers (two layers, for example), with the conductor from each coil 242 being led into a circuit board 248 via a projection 247 for interlocking with a bridging wire that forms in between neighboring teeth 243, and joined with solder to an electrode on the circuit board 248.

A cylindroid sleeve-attachment portion 216 of the baseplate 21 is provided in the baseplate central part, jutting upward, centered on the center axis J1, in the direction toward the rotor unit 3. As illustrated in FIG. 2, the sleeve unit 22 is furnished with a cylindroid sleeve 221, into which the shaft 311 is inserted, centering on the center axis J1, and with a cylindroid sleeve housing 222 attached to the outer periphery of the sleeve 221, with the sleeve unit 22 being inserted into the sleeve-attachment portion 216 to attach it to the baseplate 21.

The sleeve housing 222 is formed so that its wall thickness near the lower end ("second end portion") is thinner than its wall thickness near the upper end ("fourth end portion").

Further, a flange portion 224 of the sleeve housing 222 is formed along the outer periphery of the sleeve unit 22, integrally with the housing upper part as a protrusion that bulges outward with respect to the center axis J1. Therein, when the sleeve unit 22 is attached, the region of the flange portion 224 alongside the baseplate 21 engages, in terms of the up/down orientation, with the tip-end of the sleeve-attachment portion 216. The opening along the lower end of the sleeve unit 22 is closed over by a discoid sealing cap 23.

Figure 3:
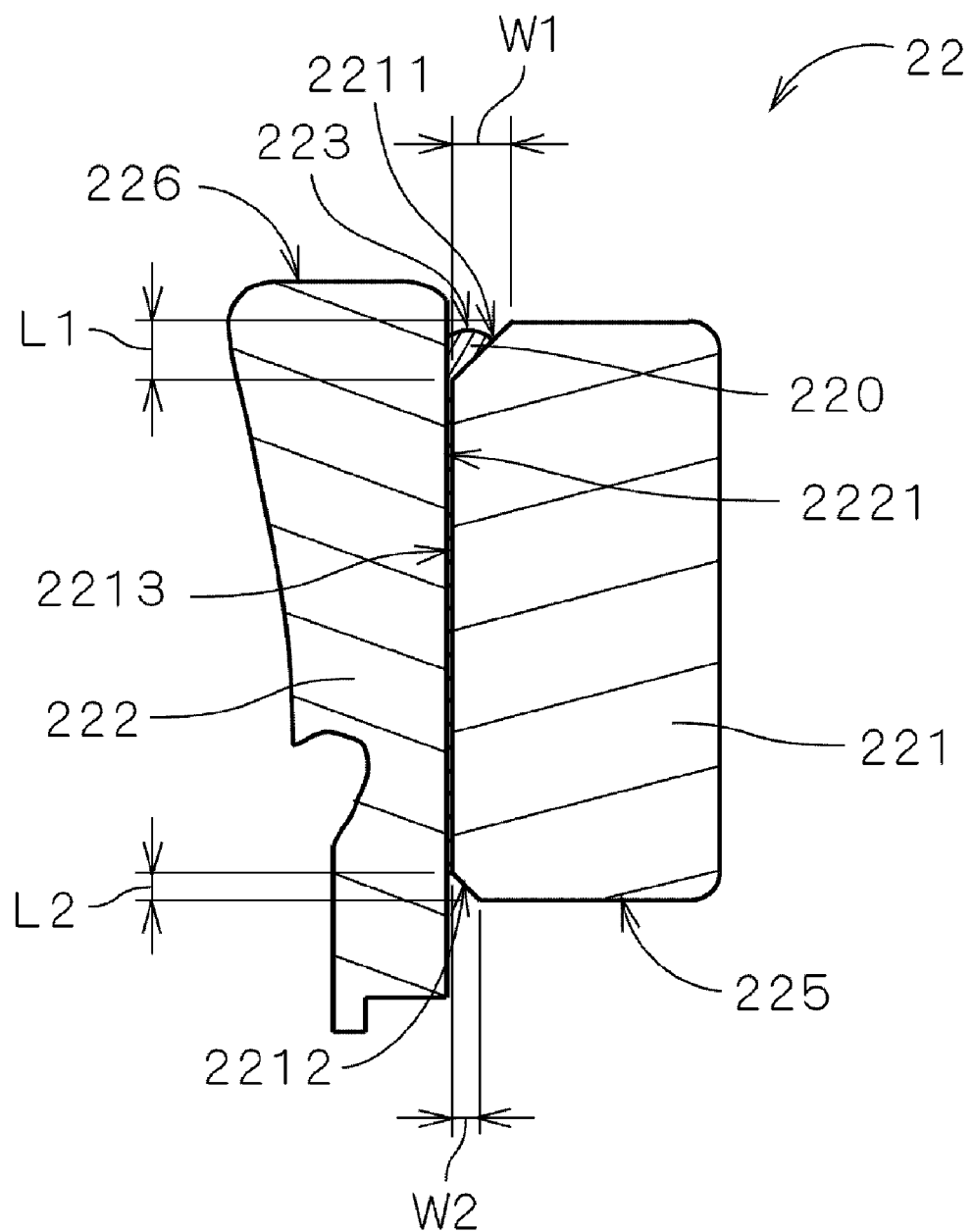
FIG. 3 is a magnified view of a portion of the FIG. 2 motor sleeve unit.

Reference is made to FIG. 3, a vertical section illustrating in a magnified view a portion of the sleeve unit 22 (the left half in FIG. 2). As indicated in FIG. 3, in the sleeve unit 22 the sleeve 221 is inserted into the sleeve housing 222 leaving a slight interspace between it and the housing inner-side surface 2221 (i.e., the sleeve is inserted at a clearance fit), and is fixed to the sleeve housing 222 via an adhesive 220 that is anaerobic or light-curable (e.g., "1355" (product name), made by Three Bond Co., Ltd.).

The sleeve 221 is a porous component, formed by putting a powdered starting material into a mold and press-hardening the material to pressure-mold it, and then sintering the compact and putting the sintered compact again into a mold to compress it into final form. Various kinds of metal powders, powders of metallic compounds, powders of non-metallic compounds, etc. may be used as the starting material for forming the sleeve 221 (for example: a blend of iron (Fe) and copper (Cu) powders; a blend of copper and tin (Sn) powders; a blend of copper, tin and lead (Pb) powders; or a blend of iron and carbon (C) powders).

The outer peripheral rim of the upper end portion ("third end portion") of the sleeve 221 (that is, the rim of the end portion opposite—in terms of the center axis J1 (c.f. FIG. 2) orientation—from a later-described first hydrodynamic bearing surface 225, and termed "sleeve upper rim" hereinafter), and the outer peripheral rim of the lower end ("first end portion") of the sleeve 221 (termed "sleeve lower rim" hereinafter) are formed in a chamfered conformation. As indicated in FIG. 3, the sleeve upper rim and the sleeve lower rim are rendered in beveled conformations having a first sleeve inclined surface 2211 and a second sleeve inclined surface 2212 that are circular (specifically, that are in the form of the lateral surface of a frustum) centering on the center axis J1; these beveled conformations are formed at the same time that the just-described sleeve 221 is formed.

The length L1 of the first sleeve inclined surface 2211 along the center axis J1 preferably is from 0.05 mm to 0.5 mm (more preferably 0.2-0.3 mm), and the length L2 of the second sleeve inclined surface 2212 along the center axis J1 preferably is from 0.05 mm to 0.5 mm (more preferably 0.1-0.2 mm). In turn, it is preferable that the width W1 of the first sleeve inclined surface 2211 along a perpendicular to the center axis J1 be from 0.17 times to 2.75 times (more preferably 1 times) the length L1 along the center axis J1, while the width W2 of the second sleeve inclined surface 2212 along a perpendicular to the center axis J1 be from 0.17 times to 2.75 times (more preferably 1 times) the length L2 along the center axis J1.

Figure 4:
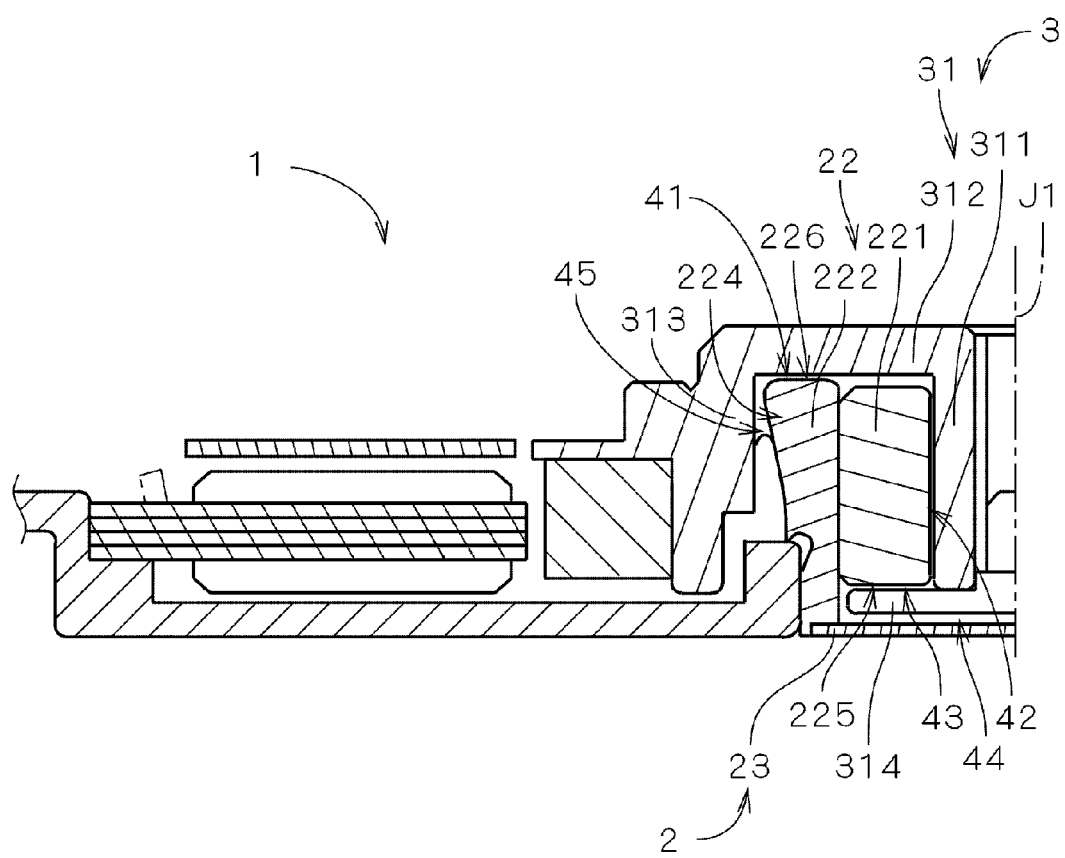
FIG. 4 is a magnified view of a portion of the FIG. 2 motor.

The description now turns to FIG. 4, a vertical section depicting, in an enlarged view, a portion (the left half in FIG. 2) of the motor 1, to explain the bearing mechanism, which exploits hydrodynamic pressure to rotatably support the rotor unit 3 against the stator unit 2 in the motor 1. As illustrated in FIG. 4, micro-gaps are provided in the motor 1, in between the undersurface of the circular plate section 312 of the rotor hub 31, and the endface of the top side of the sleeve housing 222; in between the inner-side surface of the sleeve 221, and the outer-side surface of the shaft 311; in between the endface on the bottom side of the sleeve 221, and the upper surface of the thrust plate 314; in between the undersurface of the thrust plate 314, and the upper surface of the sealing cap 23; and in between outer-side surface of the flange portion 224 of the sleeve housing 222, and the inner-side surface of the cylindrical section 313 of the rotor hub 31. In the following, these gaps will be referred to respectively as "upper gap 41," "lateral gap 42," "first lower gap 43," "second lower gap 44," and "outer-side gap 45." Lubricating oil continuously fills these gaps.

An inclined surface is created on the outer-side surface of the flange portion 224 of the sleeve housing 222, where the housing gradually constricts in outer diameter heading downward, while the cylindrical section 313 of the rotor hub 31 is formed so that its inner-side surface, which opposes the outer-side surface of the flange portion 224, is of constant diameter. By this configuration the boundary surface of the lubricating oil in the outer-side gap 45 forms a meniscus under the agency of capillary action and surface tension, constituting a taper seal, whereby the outer-side gap 45 functions as an oil buffer, preventing outflow of the lubricating oil.

On the endface 225, which is a part of the first end portion, perpendicular to the center axis J1, on the bottom side of the sleeve 221 along the center axis J1, and the endface 226, which is a part of the fourth end portion, perpendicular to the center axis J1, on the top side of the of the sleeve housing 222, grooves (for example, grooves in spiral form) for developing in the lubricating oil pressure directed toward the center axis J1 when the rotor unit 3 spins are formed, wherein thrust dynamic-pressure bearing sections are constituted by means of the first lower gap 43 and the upper gap 41. In other words, the endface 225 and the endface 226 together serve as hydrodynamic bearing surfaces. In the following, the endface 225 on the bottom side of the sleeve 221 will be referred to as the "first hydrodynamic bearing 225," while the endface 226 on the top side of the of the sleeve housing 222 will be referred to as the "second hydrodynamic bearing 226."

Meanwhile, grooves (for example, herringbone grooves provided on the top and bottom, in terms of the way in which the center axis J1 is oriented, of the inner-side surface of the sleeve 221) for developing hydrodynamic pressure in the lubricating oil are formed on one of the faces opposing each other across the lateral gap 42, wherein a radial dynamic-pressure bearing section is constituted by means of the lateral gap 42.

In the motor 1, the fact that the rotor unit 3 is non-contact supported, via the lubricating oil, by the hydrodynamic-pressure-employing bearing mechanism enables the rotor unit 3 to spin with high precision and low noise. In particular, in the hydrodynamic bearing mechanism just described, because to the extent possible air will not intervene in the bearing interior, abnormal contact between the shaft 311 and the sleeve 221 caused by air bubbles produced within the lubricating oil, and lubricating oil leakage and similar problems due to the swelling of bearing-internal air are all but eliminated. What is more, the fact that the sleeve 221 is a porous component pressured-molded from a powdered starting material means that lubricating oil is powerfully retained in the bearing mechanism, and means that particles and other impurities within the lubricating oil are absorbed, which keeps the lubricating oil clean.

In this way, in the motor 1 the gaps formed in between sleeve unit 22 (i.e., the sleeve 221 and the sleeve housing 222), the rotor hub 31, and the sealing cap 23 (i.e., the upper gap 41, the lateral gap 42, the first lower gap 43, the second lower gap 44, and the outer-side gap 45) are charged with the fluid lubricating oil. Thus when the rotor unit 3 is spinning, hydrodynamic pressure is exploited to support the rotor unit 3 through the lubricating oil. Spinning the rotor unit 3 on the stator unit 2, with the center axis J1 as center, spins the recording disk 62 (cf. FIG. 1) attached to the rotor unit 3.

Sleeve Unit Manufacturing Method

Figure 5:
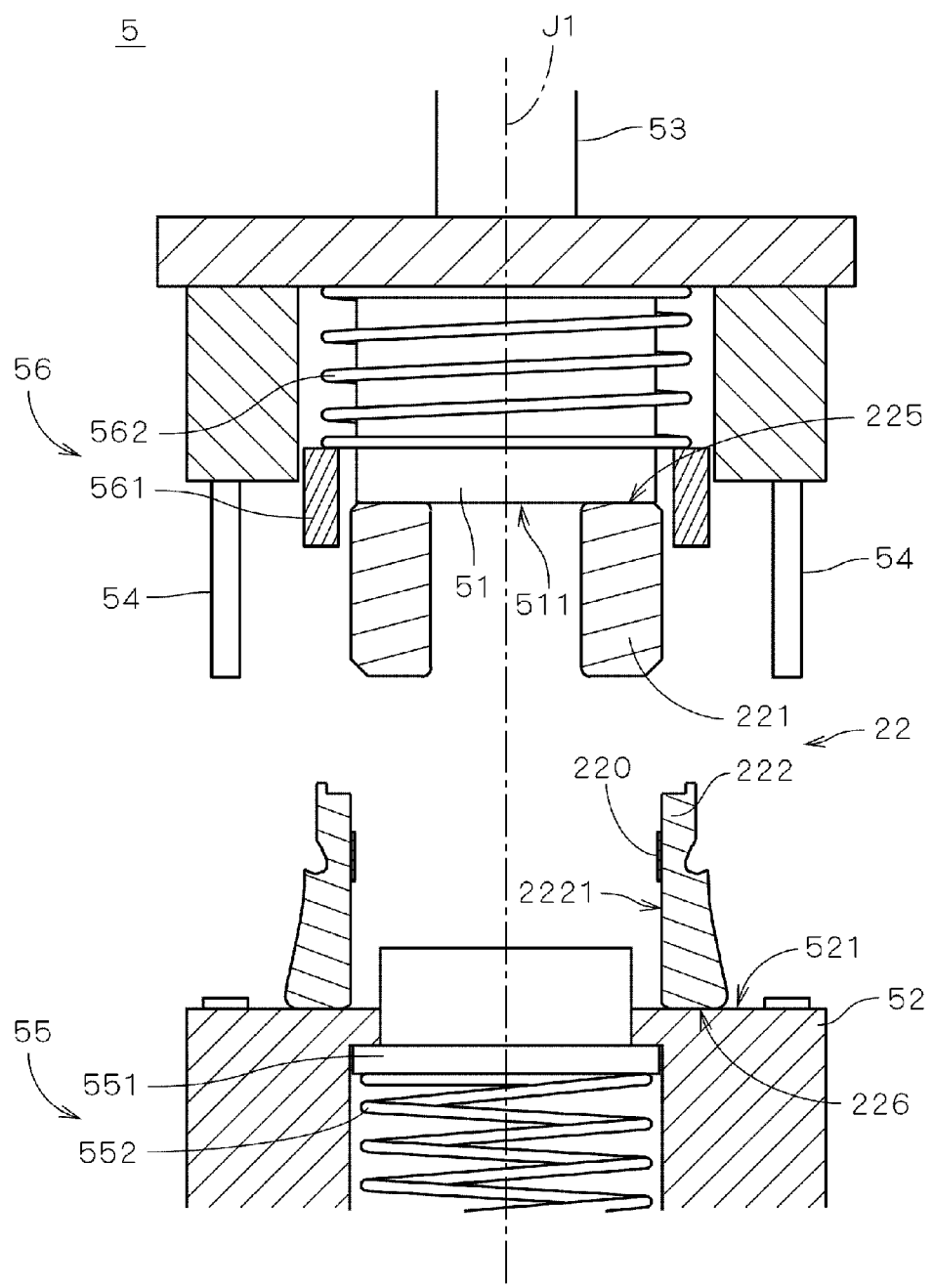
FIG. 5 is a sectional view illustrating a sleeve-unit manufacturing device for manufacturing a sleeve unit involving Embodiment 1 of the present invention.

Manufacture of the sleeve unit 22 will be explained next. Reference is made to FIG. 5, a sectional view illustrating a sleeve-unit manufacturing device 5 for manufacturing the sleeve unit 22. As indicated in FIG. 5, the sleeve-unit manufacturing device 5 is furnished with: a round columnar sleeve retainer 51 that vacuum-adsorbs the sleeve 221 to retain it; a sleeve-housing retainer 52 that retains the sleeve housing 222 with the sleeve 221 centered on the center axis J1 (that is, the center axis J1 of the sleeve unit 22 following manufacture); a shifting mechanism 53 (only its shaft is illustrated) that shifts the sleeve retainer 51 along the center axis J1 relative to the sleeve-housing retainer 52; and two travel restrictors 54 that restrict the shifting of the sleeve retainer 51 by the shifting mechanism 53 (that is, restrict its range of travel). The travel restrictors 54 are circular pin-like components that, by being clamped between the sleeve retainer 51 and the sleeve-housing retainer 52, restrict the travel of the sleeve retainer 51.

The sleeve unit 22 is formed with the sleeve-unit manufacturing device 5 by inserting the sleeve 221, retained by the sleeve retainer 51, within and anchoring it to the sleeve housing 222. As indicated in FIG. 5, in the sleeve-unit manufacturing device 5, the sleeve 221 and the sleeve housing 222 are retained upside down from the state in which they are attached to the baseplate 21 of the motor 1. It will be appreciated that the "top/bottom" of the sleeve unit 22 in the following explanation means the top/bottom in the state in which the sleeve unit 22 is attached to the baseplate 21, which is opposite the top/bottom orientation in FIG. 5.

The sleeve retainer 51 is furnished with a first abutment surface 511 that abuts on the first hydrodynamic bearing surface 225 of the sleeve 221, and a plurality of vacuum micro-channels (illustration omitted) is formed inside the sleeve retainer 51 for vacuum-adsorbing the sleeve 221. The sleeve-housing retainer 52 is furnished with a second abutment surface 521 that abuts on the second hydrodynamic bearing surface 226 of the sleeve housing 222, wherein the sleeve housing 222 is retained with the second end portion of the sleeve housing 222 on the side opposite from the second hydrodynamic bearing surface 226 being opposed to the third end portion of the sleeve 221 on the side opposite from the first hydrodynamic bearing surface 225.

The sleeve-unit manufacturing device 5 is furnished on its sleeve-housing retainer 52 side with a first urging mechanism 55 for urging the first hydrodynamic bearing surface 225 of the sleeve 221 in the direction toward the first abutment surface 511 of the sleeve retainer 51 when the sleeve 221 is being attached to the sleeve housing 222. In turn, the sleeve-unit manufacturing device 5 is furnished with a second urging mechanism 56 surrounding the sleeve retainer 51 for urging the second hydrodynamic bearing surface 226 of the sleeve housing 222 toward the second abutment surface 521 of the sleeve-housing retainer 52.

The first urging mechanism 55 projects toward the sleeve retainer 51 from a circular opening formed in the second abutment surface 521 of the sleeve-housing retainer 52, and is furnished with a round columnar first urging member 551, which enters the sleeve housing 222 through its second-hydrodynamic-bearing-surface 226 side, and with a first coil spring 552—an elastic member—provided on the side of the first urging member 551 opposite from its sleeve-retainer 51 side. The second urging mechanism 56 is furnished with a cylindroid second urging member 561, disposed encompassing the sleeve retainer 51, and with a second coil spring 562—also an elastic member—provided on the side of the second urging member 561 opposite from its sleeve-housing-retainer 52 side.

Figure 6:
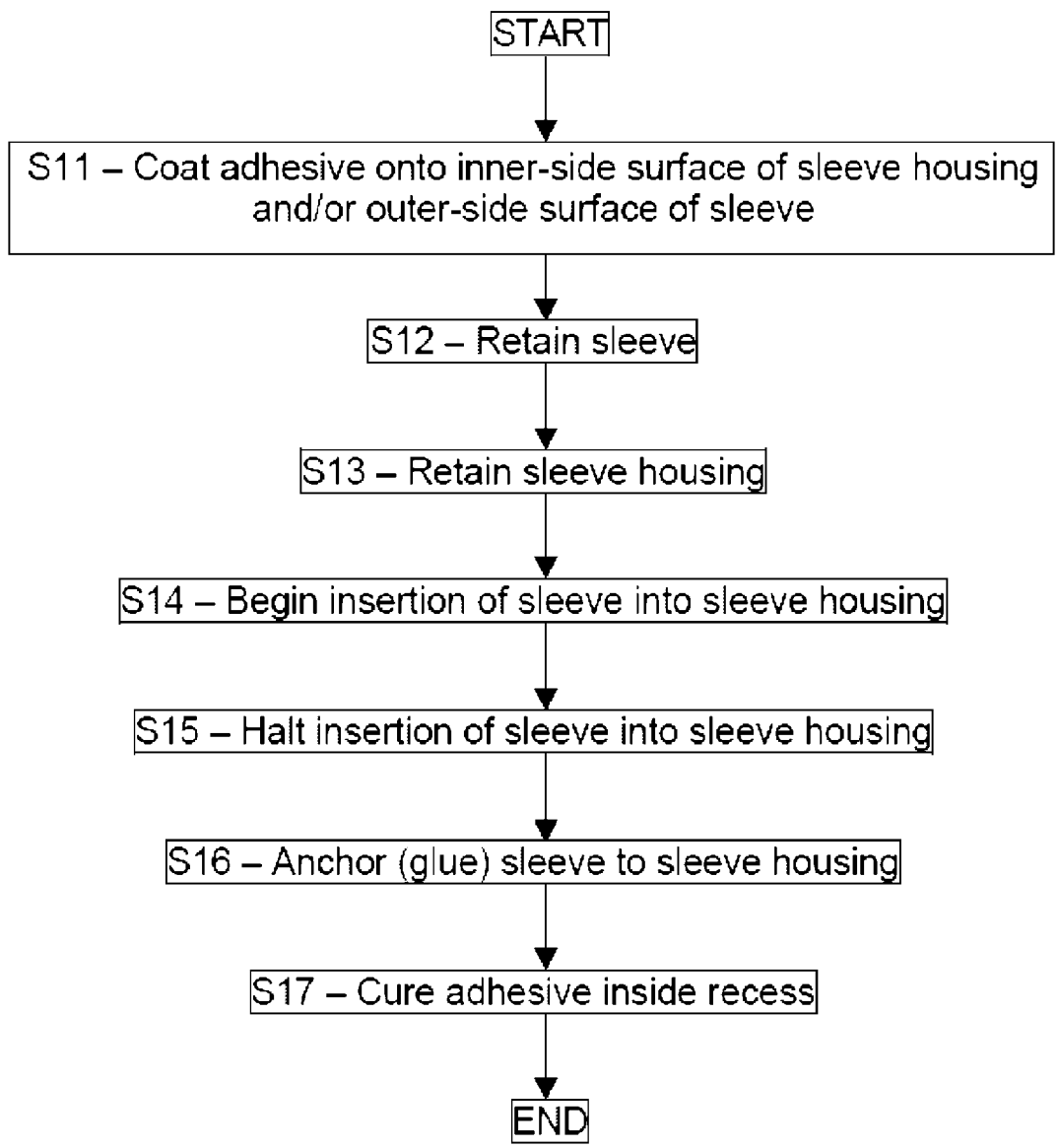
FIG. 6 is a chart setting forth process flow in the manufacture of the sleeve unit.

The description turns now to FIG. 6, a chart diagramming process flow in the manufacture of the sleeve unit 22. When a sleeve unit 22 is to be manufactured using the sleeve-unit manufacturing device 5, at first (Step S11) the adhesive 220 is coated onto the inner-side surface 2221 of the sleeve housing 222 (which, as will be described later, may be the outer-side surface of the sleeve 221). Subsequently, the sleeve 221, with its first hydrodynamic bearing surface 225 being abutted against the first abutment surface 511, is adsorption-retained by the sleeve retainer 51 (Step S12), and the sleeve housing 222, with its second hydrodynamic bearing surface 226 being abutted against the second abutment surface 521, is retained by the sleeve-housing retainer 52 (Step S13).

Once the sleeve 221 and the sleeve housing 222 have been retained, the sleeve retainer 51 is drawn close to the sleeve-housing retainer 52 by means of the shifting mechanism 53, whereby insertion of the sleeve 221 into the sleeve housing 222 is begun (Step S14). Therein, the sleeve 221 is inserted inside the sleeve housing 222 from the sleeve side opposite from its first hydrodynamic bearing surface 225.

The endface of the sleeve 221, having been inserted inside the sleeve housing 222, on the side opposite from the first hydrodynamic bearing surface 225 presently abuts on the first urging member 551 of the first urging mechanism 55, and by the first urging member 551 being pressed upon by the sleeve 221, the first coil spring 552 elastically deforms and the first hydrodynamic bearing surface 225 of the sleeve 221 is urged in the direction toward the first abutment surface 511 of the sleeve retainer 51. The spring constant of the first coil spring 552 is defined so that with the sleeve retainer 51 being in the state in which it is closest to the sleeve-housing retainer 52 (cf. later-described FIG. 7), under the elastic force of the first coil spring 552 the sleeve retainer 51 will not shift in the direction in which it parts from the sleeve-housing retainer 52. It will be appreciated that the adsorption of the sleeve 221 by the sleeve retainer 51 may be suspended after the sleeve 221 has been urged against the first abutment surface 511 by the first urging mechanism 55.

Meanwhile, before and after abutment of the sleeve 221 on the first urging member 551, the endface of the sleeve housing 222 on the side opposite from its second hydrodynamic bearing surface 226 abuts on the second urging member 561 of the second urging mechanism 56. Thus, by the second urging member 561 being pressed upon by the sleeve housing 222, the second coil spring 562 elastically deforms and the second hydrodynamic bearing surface 226 of the sleeve housing 222 is urged in the direction toward the second abutment surface 521 of the sleeve-housing retainer 52.

Figure 7:
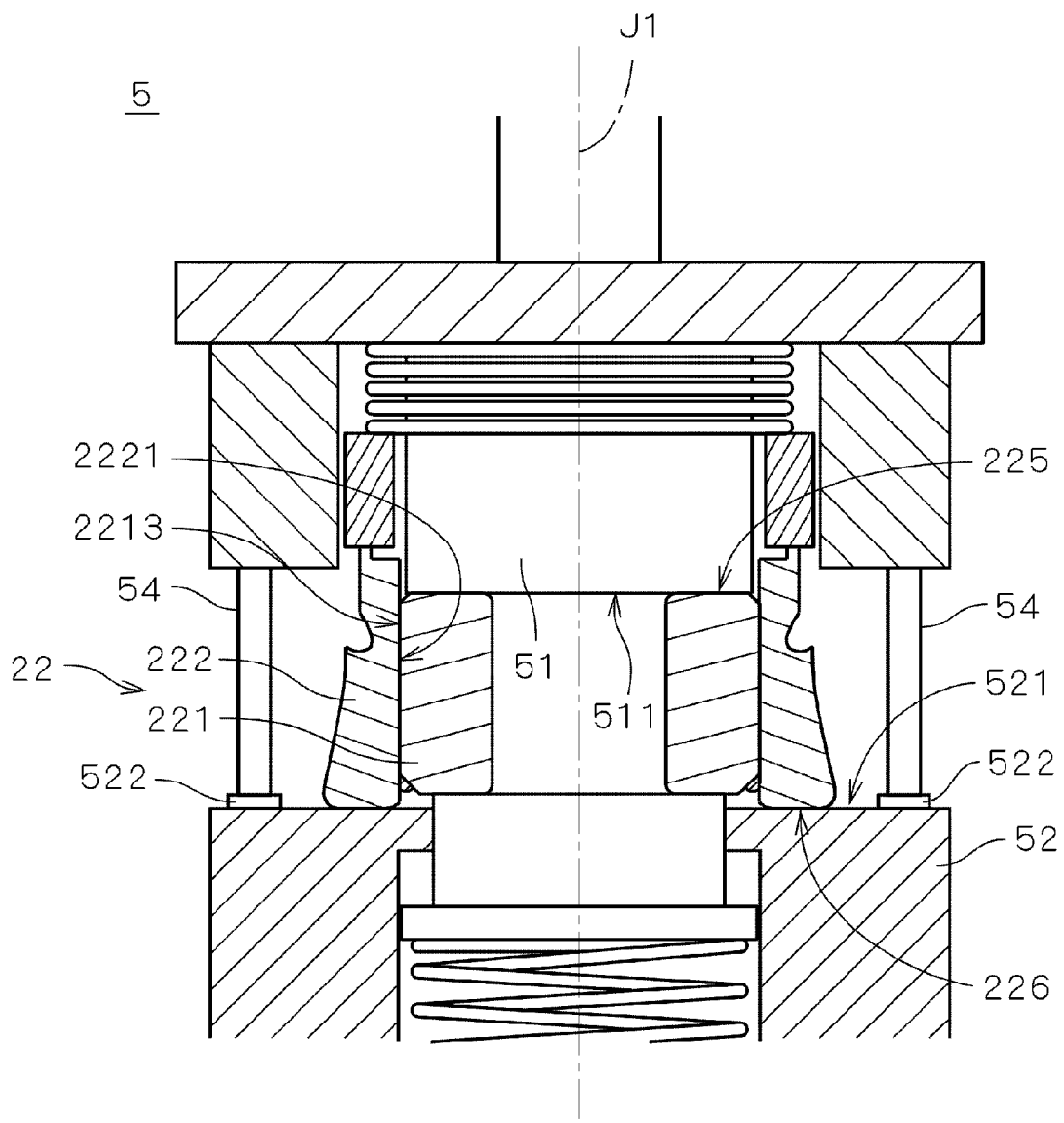
FIG. 7 is a sectional view further illustrating the sleeve-unit manufacturing device of FIG. 5.

In the sleeve-unit manufacturing device 5, as indicated in FIG. 7, by the fore ends of the travel restrictors 54 abutting on restrictor seats 522 provided atop the second abutment surface 521 of the sleeve-housing retainer 52, the movement of the sleeve retainer 51 is restricted, halting the insertion of the sleeve 221 into the sleeve housing 222 (Step S15).

In the sleeve-unit manufacturing device 5, the length of the travel restrictors 54 along the center axis J1 is defined so that the movement of the sleeve retainer 51 will be restricted when the separation, in regard to the center axis J1 orientation, between the first abutment surface 511 of the sleeve retainer 51 and the second abutment surface 521 of the sleeve-housing retainer 52 has become equal to the designed measurement for the separation (termed "designed separation" hereinafter), in regard to the center axis J1 orientation, between the first hydrodynamic bearing surface 225 of the sleeve 221 and the second hydrodynamic bearing surface 226 of the sleeve housing 222 (termed "bearing-surface span" hereinafter). The bearing-surface span in the sleeve unit 22 is thereby precisely defined so as to be equal to the designed separation (including tolerance). The tolerance for the bearing-surface span in the sleeve unit 22 preferably is 15 µm or less.

Once the movement of the sleeve retainer 51 has been restricted, the sleeve 221 and the sleeve housing 222 are retained for a predetermined time period (for example, 2 minutes), and the anaerobic adhesive 220 (cf. FIG. 3), whose contact with external air in the interval between the outer-side surface 2213 of the sleeve 221 and the inner-side surface 2221 of the sleeve housing 222 is cut off, cures to anchor (adhere) the sleeve 221 to the inner-side surface 2221 of the sleeve housing 222 (Step S16).

In the sleeve unit 22, as indicated in FIG. 3, the adhesive 220 that is pressed out toward the second hydrodynamic bearing surface 226 by the insertion of the sleeve 221 into the sleeve housing 222 is accommodated along the sleeve upper rim in a recess 223 formed in between the first sleeve inclined surface 2211 of the sleeve 221, and the inner-side surface 2221 of the sleeve housing 222. Put differently, the recess 223, which is formed by the chamfered conformation of the upper rim of the sleeve 221, serves as a so-called adhesive reservoir where the adhesive 220 that has been pressed out by the insertion of the sleeve 221 is accommodated. Then, the portion of the adhesive 220 that is accommodated in the recess 223 is cured by exposure to ultraviolet rays or other radiation, whereupon the manufacture of the sleeve unit 22 is finished (Step S17).

In the manufacture of the sleeve unit 22, instead of coating the adhesive 220 onto the inner-side surface 2221 of the sleeve housing 222 (Step S11), the adhesive 220 may be coated onto the outer-side surface 2213 of the sleeve 221. Likewise, the adhesive 220 may be coated onto both the outer-side surface 2213 of the sleeve 221 and the inner-side surface 2221 of the sleeve housing 222. The coating of the adhesive 220 onto the outer-side surface 2213 of the sleeve 221 and/or the inner-side surface 2221 of the sleeve housing 222 (Step S11) may be performed at any time, as long as it is carried out earlier than the process that commences the insertion of the sleeve 221 into the sleeve housing 222 (Step S14); for example, the adhesive 220 may be applied following the retention of the sleeve 221 and the sleeve housing 222 (Steps S12 and S13). This is also true for the examples of FIGS. 8 and 9, and the second embodiment, to be described later.

As explained in the foregoing, in the manufacture of the sleeve unit 22 by means of the sleeve-unit manufacturing device 5, when the sleeve 221 is inserted inside and glued to the sleeve housing 222, the endface 225 on the bottom side of the sleeve 221 in FIG. 3 (the first hydrodynamic bearing surface, which in FIG. 5 is on the top side) is urged in the direction toward the first abutment surface 511 of the sleeve retainer 51—which is one alignment member—while abutting on the first abutment surface 511. Meanwhile, the endface 226 on the top side of the sleeve housing 222 in FIG. 3 (the second hydrodynamic bearing surface, which in FIG. 5 is on the bottom side) is urged in the direction toward the second abutment surface 521 of the sleeve-housing retainer 52—which is another alignment member—while abutting on the second abutment surface 521. The opportune manufacturing of a sleeve unit 22 by gluing the cylindrical outer-side surface of the sleeve 221 to the cylindrical inner-side surface of the sleeve housing 222 while maintaining the position, with respect to the sleeve retainer 51, of the endface 225—which is the gauging surface—of the sleeve 221, and the position, with respect to sleeve-housing retainer 52, of the endface 226—which is the gauging surface—of the sleeve housing 222 is thereby realized.

In the manufacture of the sleeve unit 22, because the sleeve 221 is inserted into the sleeve housing 222 from the side opposite from the sleeve's first hydrodynamic bearing surface 225, the adhesive 220 can be prevented from sticking to the first hydrodynamic bearing surface 225. What is more, with the sleeve upper rim of the sleeve 221 being a chamfered confirmation, the recess 223 that accommodates adhesive 220 pressed out by the insertion of the sleeve 221 is formed, which along the sleeve-unit side opposite from the first hydrodynamic bearing surface 225 prevents the adhesive 220 from overflowing onto the endfaces of the sleeve 221 and the sleeve housing 222. At the same time, this configuration restrains the adhesive 220 from bulging out along the sleeve-unit side opposite from the first hydrodynamic bearing surface 225. The result, which improves manufacturing yield, is that the adhesive 220 is prevented from sticking to the second hydrodynamic bearing surface 226, which is the endface of the sleeve housing 222 on the side thereof opposite, with regard to the center axis J1, from the side through which the sleeve 221 is inserted.

Furthermore, the manufacture of the sleeve unit 22, with the portion of the adhesive 220 that is accommodated in the recess 223 hardened, a wedge effect is produced along the upper-end side of the sleeve 221 (that is, the side opposite from the first hydrodynamic bearing surface 225), thanks to which enhanced adhesive strength between the sleeve 221 and the sleeve housing 222 against upwardly directed loads that are applied to the sleeve 221 is made possible. As a result, the sleeve 221 may be firmly anchored to the sleeve housing 222 even in implementations in which the length along which the sleeve 221 and the sleeve housing 222 are joined in the center axis J1 orientation is comparatively short, allowing the length of the sleeve unit 22 along the center axis J1 to be shortened to make a thinner-profile motor 1.

In the manufacture of the sleeve 221, rather than subject the sleeve upper rim to a beveling process following formation of the sleeve 221, at the same time that the sleeve 221 is formed, the sleeve upper rim can be formed into the chamfered conformation. The manufacture of the sleeve 221 can be simplified and the sleeve unit 22 manufacturing costs can be reduced as a result.

In the manufacture of the sleeve unit 22, because anaerobic adhesive 220 is utilized for fixing the sleeve 221 to the sleeve housing 222, the sleeve 221 can be anchored to the sleeve housing 222 merely by retaining for a predetermined period of time the sleeve 221 in the state in which it is inserted into the sleeve housing 222, enabling the manufacture of the sleeve unit 22 to be simplified.

A thermosetting adhesive (for example, "353 ND" (product name), manufactured by Epoxy Technology Co.) may be employed as the glue for anchoring the sleeve 221. In that case, the adhesive is cured by placing the sleeve housing 222 and the sleeve 221 having been inserted inside the sleeve housing 222, retained in a jig, inside a vessel at a temperature of 90° C. for 1 hour. In implementations in which a thermosetting adhesive is employed, both the adhesive in between the outer-side surface 2213 of the sleeve 221 and the inner-side surface 2221 of the sleeve housing 222, and the adhesive accommodated in the recess 223 can be simultaneously cured by a heating process, therefore allowing the manufacture of the sleeve unit 22 to be simplified.

In the manufacture of the sleeve unit 22, the sleeve 221 is attached to the sleeve housing 222 with a clearance fit, whereby the outer-side surface 2213 of the sleeve 221 and the inner-side surface 2221 of the sleeve housing 222 are prevented from rubbing against each other when the sleeve 221 is inserted into the sleeve housing 222. Warping of the first hydrodynamic bearing surface 225 of the sleeve 221 and the second hydrodynamic bearing surface 226 of the sleeve housing 222, as well as of the sleeve 221 inner-side surface, which constitutes the radial bearing section, can thereby be prevented. The sleeve-unit manufacturing device 5, thus enabling the sleeve 221 to be easily inserted into the sleeve housing 222 while preventing friction between it and the sleeve housing 222, is especially suited to the installation of the sleeve 221—which compared to the solid form of the material is a relatively fragile porous component—into the sleeve housing 222.

In the manufacture of the sleeve unit 22, when the sleeve housing 222 is formed from a synthetic resin, or in similar implementations, if there is no risk of the first hydrodynamic bearing surface 225 of the sleeve 221 warping due to friction between it and the sleeve housing 222, then the sleeve 221 may be press-fit into the sleeve housing 222. In that case, the process of anchoring the sleeve 221 to the sleeve housing 222 (Step S16) may be completed at the same time that the insertion of the sleeve 221 inside the sleeve housing 222 is completed (Step S15). Furthermore, if the sleeve 221 is press-fitted, then the process of coating an adhesive onto the inner-side surface 2221 of the sleeve housing 222 and/or the outer-side surface 2213 of the sleeve 221 (Step S11) may be omitted.

In the sleeve unit 22, the sleeve housing 222 is formed so that its wall thickness in the vicinity of the lower end (i.e., what amounts to the lower-end portion when attached to the baseplate 21—the end portion through which the sleeve 221 is inserted) is thinner than its wall thickness in the vicinity of the upper end. A result of this conformation is that even if the sleeve 221 when being inserted should touch on the inner peripheral edge of the lower-end portion of the sleeve housing 222, due to some cause such as the adsorption position of the sleeve 221 along the sleeve retainer 51 being slightly off, the resistance produced by the contact will be small compared to a situation in which the sleeve 221 is inserted through the upper-end portion. The sleeve 221 can therefore be readily inserted into the sleeve housing 222.

In the sleeve-unit manufacturing device 5, during insertion of the sleeve 221 into the sleeve housing 222 the movement of the sleeve retainer 51 being restricted by the travel restrictors 54 enables the alignment of the sleeve 221 with the sleeve housing 222 along the center axis J1 to be precisely carried out. In the motor 1 furnished with the sleeve unit 22 having on the sleeve 221 the first hydrodynamic bearing surface 225 perpendicular to the center axis J1 and having, on the side of the sleeve housing 222 that is opposite from where the first hydrodynamic bearing surface 225 is, the second hydrodynamic bearing surface 226, this precision in alignment enables the bearing-surface span in the sleeve unit 22 to be defined with precision, in turn enabling stabilized thrust dynamic pressure in the upper gap 41 and first lower gap 43 of the bearing mechanism to be obtained. The result is that the quality of the motor 1 can be made constant. Thus, this sleeve-unit manufacturing device 5 that enables sleeve units to be manufactured while precisely defining the bearing-surface span is especially suited to the manufacture of sleeve units 22 in which the tolerance for the bearing-surface span is not greater than 15 μm.

Likewise, in the sleeve-unit manufacturing device 5, during the sleeve 221 insertion into the sleeve housing 222 the first hydrodynamic bearing surface 225 is urged against the first abutment surface 511 by the first urging mechanism 55, while the second hydrodynamic bearing surface 226 is urged against the second abutment surface 521 by the second urging mechanism 56, and the travel of the sleeve 221 is restricted according to the separation between the first abutment surface 511 and the second abutment surface 521, whereby the bearing-surface span in the sleeve unit 22 can be readily established with an excellent level of precision. What is more, the parallelism between the first hydrodynamic bearing surface 225 and the second hydrodynamic bearing surface 226 can also be established with a satisfactory degree of precision.

Inasmuch as the sleeve 221 of the sleeve unit 22 is formed by pressure-molding and then sintering a metallic powder or other suitable raw material, manufacturing discrepancies in the length along the center axis J1 are large compared to sleeves from solid material. With the sleeve-unit manufacturing device 5, because the alignment of the sleeve 221 and the sleeve housing 222 is carried out according to the separation between the first hydrodynamic bearing surface 225 and the second hydrodynamic bearing 226, even in implementations employing a sleeve 221 having a comparatively significant manufacturing error (25 μm to 35 μm, for example) in the length along the center axis J1, the sleeve unit 22 can be manufactured with the bearing-surface span being precisely defined.

In particular, because the first coil spring 552—an elastic member—in the first urging mechanism 55 supports the first urging member 551, when a plurality of sleeve units 22 are being continuously manufactured, even in cases in which the center-axis J1 oriented lengths of sleeves 221 of the plurality that is prepared differ from each other, the first hydrodynamic bearing surface 225 of each of the sleeves 221 of lengths that differ can be suitably spring-biased against the first abutment surface 511. It should be noted that depending on the design of the sleeve unit 22, the sleeve 221 and the sleeve housing 222 may be formed as molded-resin articles, or else may be formed by a procedure that includes cutting and grinding processes, or by the metal injection molding (MIM) operation set forth in Japanese Unexamined Pat. App. Pub. No. H08-7463 (the same goes for the second embodiment to be described later).

By employing as the travel restrictors 54 in the sleeve-unit manufacturing device 5 components that restrict the travel of the sleeve retainer 51 by sandwiching in between the sleeve retainer 51 and the sleeve-housing retainer 52, the structure of the sleeve-unit manufacturing device 5 can be simplified.

Modified Example

Figure 8:
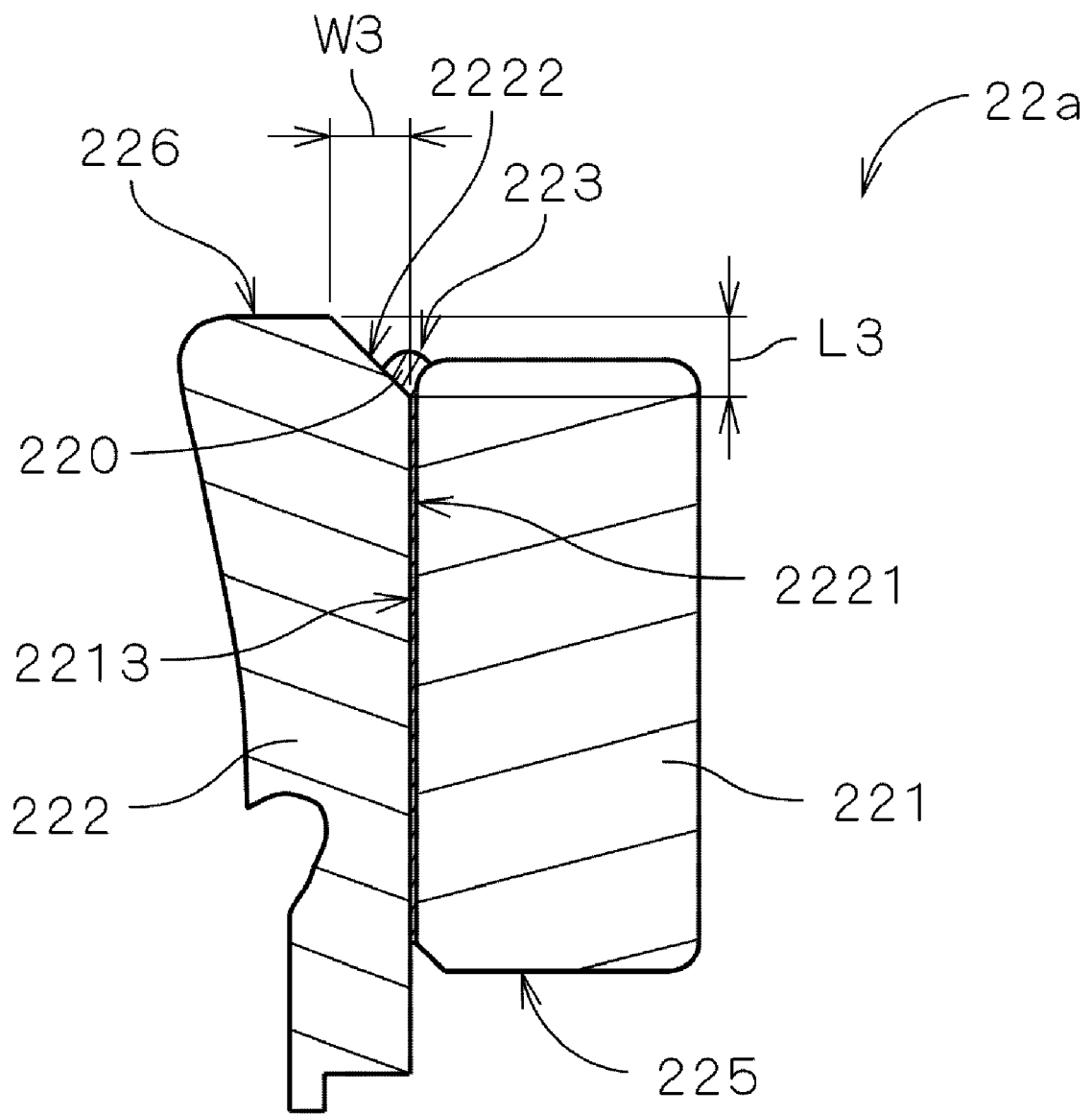
FIGS. 8 and 9 are vertical sectional views each illustrating a portion of respective modified examples of the sleeve unit.

Next, with reference to FIG. 8, a vertical section illustrating a portion of a motor sleeve unit 22a involving another example of the present invention, an explanation will be made of the manufacture of the sleeve unit 22a. As indicated in FIG. 8, as an alternative to the upper rim feature on the sleeve, the inner peripheral margin of the upper-end portion of the sleeve housing 222 (i.e., the inner peripheral margin—which will be termed "sleeve housing brim" hereinafter—of the end portion on the side opposite, with regard to the center axis J1 (cf. FIG. 2) orientation, from where the sleeve 221 is inserted) is fashioned in a chamfered conformation. The rest of the configuration is the same as that of FIG. 3, and is labeled with the same reference marks in the explanation that follows. Likewise, the configuration of the sleeve-unit manufacturing device 5 employed in the manufacture of the sleeve unit 22a, and the process flow in the manufacture of the sleeve unit 22a are the same as those of FIGS. 5 and 6.

In the sleeve unit 22a the sleeve housing brim, as illustrated in FIG. 8, by a beveling process is formed with a beveled conformation having an annular sleeve-housing inclined surface 2222 (specifically, in the form of the lateral surface of a frustum) centering on the center axis J1. The length L3 of the sleeve-housing inclined surface 2222 in the center axis J1 orientation preferably is from 0.05 mm to 0.5 mm (more preferably 0.2-0.3 mm), while the width W3 of the sleeve-housing inclined surface 2222 along a perpendicular to the center axis J1 preferably is from 0.17 times to 2.75 times (more preferably 1 times) the length L3 along the center axis J1.

When the sleeve unit 22a is manufactured, at first (FIG. 6: Step S11), the adhesive 220 is coated onto the inner-side surface 2221 of the sleeve housing 222 (and/or the outer-side surface 2213 of the sleeve 221), likewise as with Embodiment 1, and (Steps S12 and S13) the sleeve 221 and the sleeve housing 222 are retained by the sleeve retainer 51 and the sleeve-housing retainer 52 of the sleeve-unit manufacturing device 5 (cf. FIG. 5).

Subsequently, the sleeve retainer 51 is drawn close to the sleeve-housing retainer 52 by means of the shifting mechanism 53, whereby insertion of the sleeve 221 into the sleeve housing 222 is begun (Step S14). At this time, the sleeve 221 is inserted inside the sleeve housing 222 through the side opposite from the first hydrodynamic bearing surface 225. Then, with the first hydrodynamic bearing surface 225 of the sleeve 221 urged against the first abutment surface 511 by the first urging mechanism 55, and with the second hydrodynamic bearing surface 226 of the sleeve housing 222 urged against the second abutment surface 521 by the second urging mechanism 56, the movement of the sleeve retainer 51 is restricted by the travel restrictors 54, whereby the bearing-surface span is precisely defined and the insertion of the sleeve 221 into the sleeve housing 222 is halted (Step S15).

Once the insertion of the sleeve 221 has come to a stop, the sleeve 221 and the sleeve housing 222 are retained for a predetermined time period to cure the anaerobic adhesive 220 and thereby anchor (adhere) the sleeve 221 to the inner-side surface 2221 of the sleeve housing 222 (Step S16). In the sleeve unit 22, the adhesive 220 that is pressed out toward the second hydrodynamic bearing surface 226 by the insertion of the sleeve 221 into the sleeve housing 222 is accommodated along the sleeve housing brim 2213 in the recess 223, formed in this case in between the sleeve-housing inclined surface 2222 of the sleeve housing 222, and the outer-side surface 2213 of the sleeve 221. Then, the portion of the adhesive 220 that is accommodated in the recess 223 is cured by exposure to ultraviolet rays or other radiation, whereupon the manufacture of the sleeve unit 22 is finished (Step S17).

As explained in the foregoing, in the manufacture of the motor sleeve unit 22a involving the modified example, in a manner similar to that of Embodiment 1, because the sleeve 221 is inserted into the sleeve housing 222 from the side opposite from the sleeve's first hydrodynamic bearing surface 225, the adhesive 220 can be prevented from sticking to the first hydrodynamic bearing surface 225. In the sleeve unit 22a, the sleeve-housing brim of the sleeve housing 222 is rendered into a chamfered conformation to form the recess 223, whereby along the sleeve-unit side opposite from the first hydrodynamic bearing surface 225, the adhesive 220 can be prevented from overflowing onto the endfaces of the sleeve 221 and the sleeve housing 222, and the adhesive 220 can be restrained from bulging out. The result, similar to Embodiment 1, is that the adhesive 220 can be prevented from sticking to the second hydrodynamic bearing surface 226 of the sleeve housing 222.

In the manufacture of the motor sleeve unit 22a, with the portion of the adhesive 220 that is accommodated in the recess 223 hardened, a wedge effect is produced along the upper-end side of the sleeve housing 222 (that is, alongside the second hydrodynamic bearing surface 226), thanks to which enhanced adhesive strength between the sleeve 221 and the sleeve housing 222 against upwardly directed loads that are applied to the sleeve housing 222 is made possible.

Inasmuch as the sleeve housing 222 is formed, in the same way as in Embodiment 1, so that its wall thickness in the vicinity of the lower end is thinner than its wall thickness in the vicinity of the upper end, the sleeve 221 can therefore be readily inserted into the sleeve housing 222 in the manufacture of the motor sleeve unit 22a. And the fact that anaerobic adhesive 220 is utilized for fixing the sleeve 221 to the sleeve housing 222 enables the manufacture of the sleeve unit 22 to be simplified. Furthermore, implementations in which a thermosetting adhesive is employed instead of the anaerobic adhesive 220 also allow the manufacture of the sleeve unit 22 to be simplified.

Figure 9:
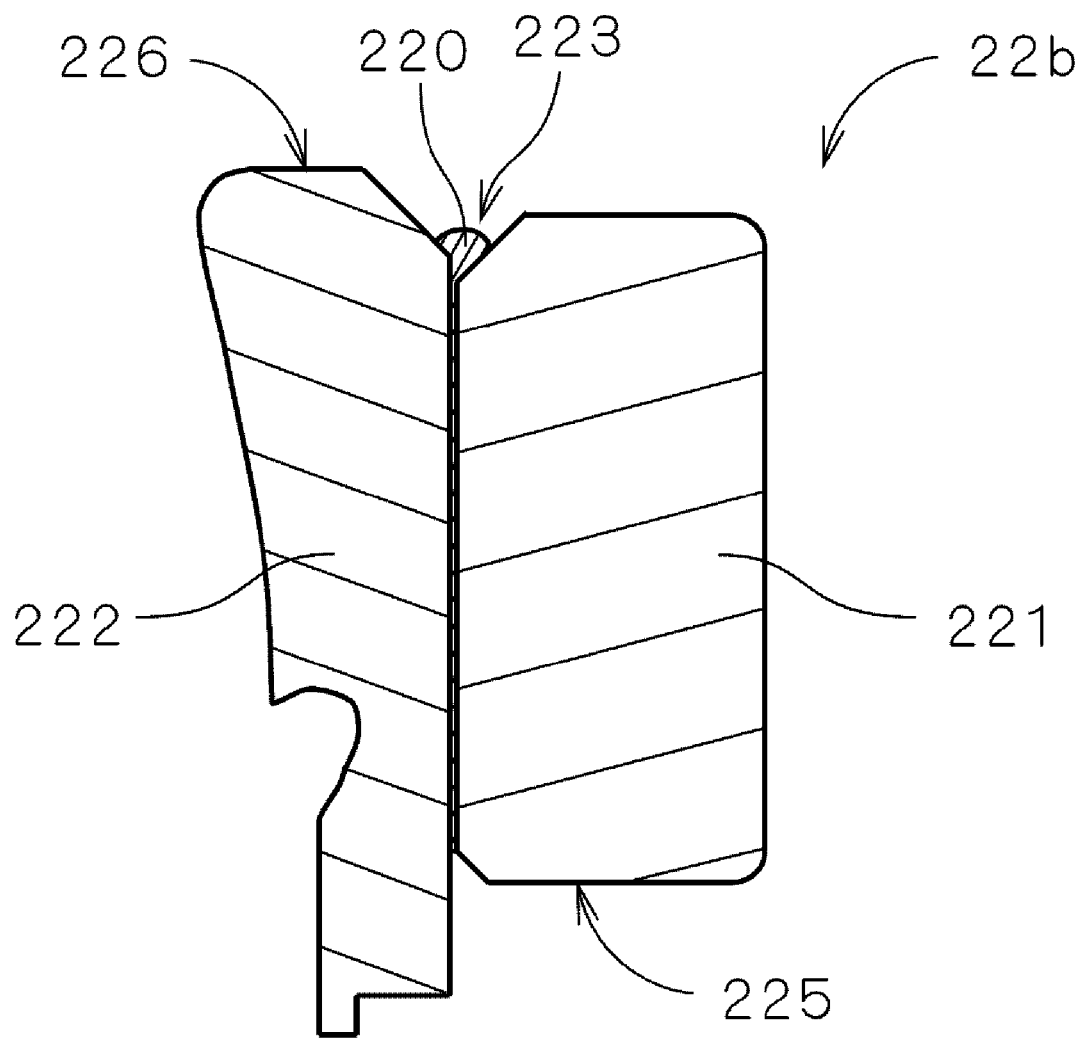

Reference is now made to FIG. 9, a vertical section representing still another preferable example of a sleeve unit. In the sleeve unit 22b illustrated in FIG. 9, both the sleeve upper rim of the sleeve 221 and the sleeve-housing brim of the sleeve housing 222 are rendered in a chamfered conformation. In this sleeve unit 22b as well, because the adhesive 220 that is pressed out during insertion of the sleeve 221 into the sleeve housing 222 is accommodated in the recess 223, the adhesive 220 can be prevented from overflowing onto the endfaces of the sleeve 221 and of the sleeve housing 222, and the adhesive 220 can be restrained from bulging out, along the sleeve-unit side opposite from the first hydrodynamic bearing surface 225. The adhesive 220 can be prevented from sticking to the first hydrodynamic bearing surface 225 and the second hydrodynamic bearing surface 226 of the sleeve unit 22b as a result.

Embodiment 2

Next, a motor involving Embodiment 2 of the present invention will be explained with reference to FIG. 10, which depicts in an enlarged vertical section a portion of the motor 1, and is a view that corresponds to FIG. 4. In the motor 1 of FIG. 10, the structure of the sleeve unit 22 is the only difference compared with the motor 1 of FIG. 4. The rest of the configuration is the same as that of FIG. 4 and is labeled with the same reference marks.

Figure 10:
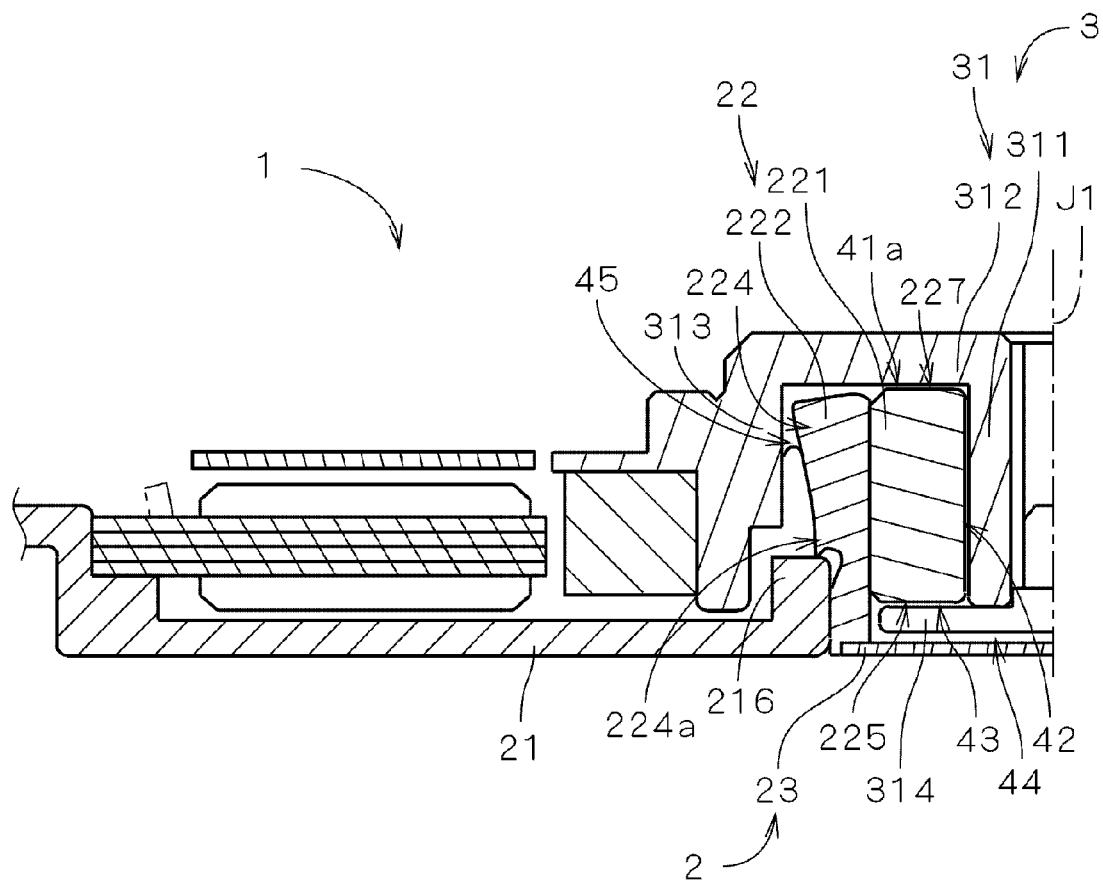
FIG. 10 is a vertical sectional view illustrating a portion of a motor involving Embodiment 2.

In the motor represented in FIG. 10, on the top side along the center axis J1 of the sleeve 221, the endface 227 perpendicular to the center axis J1 is positioned slightly more upward than the endface on the top side of the sleeve housing 222 (the endface opposing the circular plate section 312 of the rotor hub 31). Grooves for developing in the lubricating oil pressure heading toward the center axis J1 when the rotor unit 3 is spinning are formed on the endface 227 on the top side of the sleeve 221 and, on the bottom side, on the endface 225 perpendicular to the center axis J1, wherein thrust dynamic-pressure bearing sections are constituted by means of a gap 41a between the endface 227 and the undersurface of the circular plate section 312 of the rotor hub 31, and the gap 43 (i.e., the first lower gap 43) between the endface 225 and the upper surface of the thrust plate 314. Accordingly, in the present embodiment, the endface 225 on the bottom side of the sleeve 221, likewise as in Embodiment 1, is the "first hydrodynamic bearing surface" 225, while the top-side endface 227 is, instead of the endface 226 on the top side of the sleeve housing 222 in FIG. 4, a "second hydrodynamic bearing surface" 227.

The lubricating oil that continuously fills, in FIG. 10, the second lower gap 44, first lower gap 43, lateral gap 42 and upper gap 41a is retained, in the same way as in Embodiment 1, within the bearing mechanism by means of the taper seal formed in the outer-side gap 45. Further, grooves for developing hydrodynamic pressure in the lubricating oil are formed on one of the faces opposing each other across the lateral gap 42 (i.e., the inner-side surface of the sleeve 221 and the outer-side surface of the shaft 311), wherein a radial dynamic-pressure bearing section is constituted by means of the lateral gap 42.

A flange portion 224 of the sleeve housing 222 is formed along the outer periphery of the sleeve unit 22, integrally with the housing upper part as a protrusion that bulges outward with respect to the center axis J1, wherein the wall thickness of the sleeve housing 222 near its upper end portion is thicker than the wall thickness near its lower end portion. Further, an engagement part 224a that is a section of the flange portion 224 alongside the baseplate 21 engages, in terms of the up/down orientation, with the tip-end of the sleeve-attachment portion 216 of the baseplate 21, to install the sleeve housing 222 lower-end portion and its vicinity in the baseplate 21. Herein, the opening along the lower end of the sleeve unit 22 is closed over by a discoid sealing cap 23.

Figure 11:
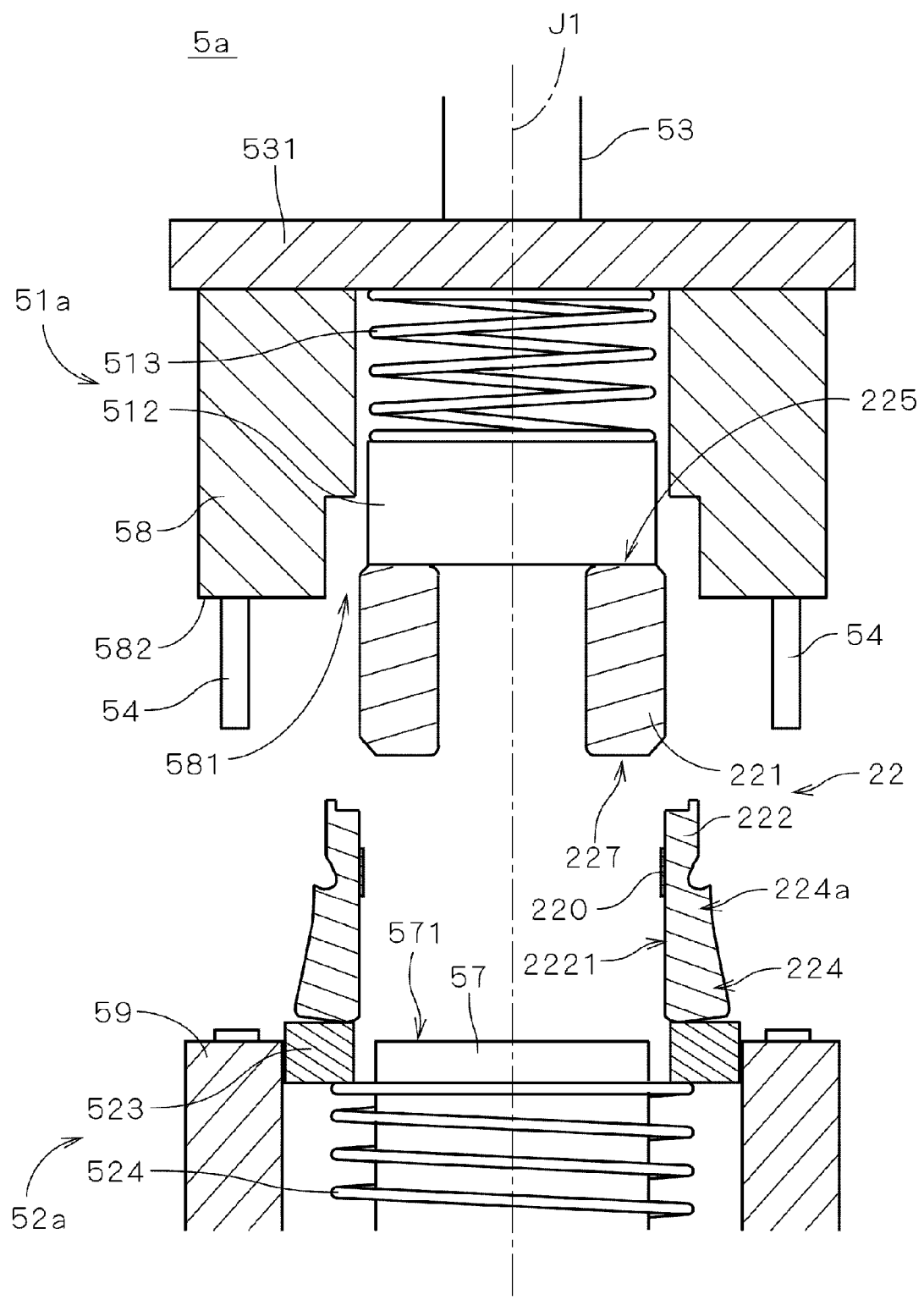
FIG. 11 is a sectional view illustrating a sleeve-unit manufacturing device for manufacturing a sleeve unit involving Embodiment 2 of the present invention.

Next, an explanation of the manufacture of the sleeve unit 22 of FIG. 10 will be made referring initially to FIG. 11, a vertical sectional view representing a sleeve-unit manufacturing device 5a for manufacturing the sleeve unit 22. As illustrated in FIG. 11, the sleeve-unit manufacturing device 5a is furnished with: a sleeve retainer 51a that retains the sleeve 221; a sleeve-housing retainer 52a that, with the sleeve 221 center axis J1 (that is, the center axis J1 of the sleeve unit 22 following manufacture) as center, retains the sleeve housing 222; a columnar first alignment member 57 that is disposed on the side of the sleeve housing 222 opposite from the sleeve 221, and that opposes the sleeve 221 in terms of the center axis J1 orientation; and a circular cylinder member 59 that encloses the sleeve-housing retainer 52a periphery and centers on the center axis J1.

It will be appreciated that in the present embodiment as well, the sleeve unit 22 is formed by inserting the sleeve 221, retained in the sleeve retainer 51, inside and anchoring it to the sleeve housing 222. In the sleeve-unit manufacturing device 5a illustrated in FIG. 11, the sleeve 221 and sleeve housing 222 are retained with their top and bottom inverted from the state they are in when installed on the baseplate 21 of the motor 1 in FIG. 10.

The sleeve retainer 51a includes a first holding platform 512 that retains the sleeve 221 by vacuum-adsorbing its first hydrodynamic bearing surface 225, and a coil spring 513—an elastic member—provided in between the first holding platform 512 and a support plate 531, wherein the sleeve 221 is retained with its second hydrodynamic bearing surface 227 opposing, in terms of the center axis J1, the first alignment member 57. The sleeve-housing retainer 52a includes a coil spring 524—also an elastic member—disposed encompassing the first alignment member 57, and an annular second holding platform 523 installed on the sleeve-retainer 51 side of the coil spring 524. The endface of the sleeve housing 222 on the flange-portion 224 side abuts on and is supported by the second holding platform 523.

The sleeve-unit manufacturing device 5a further includes a cylindroid second alignment member 58 provided encompassing the sleeve retainer 51a. An annular cut 581 is formed along the inner peripheral margin of the end portion of the alignment member 58 on its sleeve-housing retainer 52 side. The second alignment member 58 is fixed to the support plate 531, with the shaft of the shifting mechanism 53 (only the shaft is illustrated) being connected to the support plate 531. The support plate 531 being shifted along the center axis J1 by the shifting mechanism 53 unitarily shifts the sleeve retainer 51a and the second alignment member 58 along the center axis J1 relative to the sleeve-housing retainer 52a and the cylinder member 59. Further, the two columnar travel restrictors 54 are provided on the endface 582 of the second alignment member 58 on its sleeve-housing retainer 52a side, wherein by the travel restrictors 54 abutting on the cylinder member 59, the shifting-mechanism 53 driven movement of the sleeve retainer 51a and second alignment member 58 is restricted (that is, their range of travel is limited).

Next, while referring to FIG. 6 an explanation of the process flow in manufacturing the sleeve unit 22 of FIG. 10 will be made. When a sleeve unit 22 is to be manufactured using the sleeve-unit manufacturing device 5a, at first (Step S11) the adhesive 220 is coated onto the inner-side surface 2221 of the sleeve housing 222 (which may be the outer-side surface of the sleeve 221). Meanwhile, the sleeve 221, with its first hydrodynamic bearing surface 225 being abutted against the first holding platform 512 and with its second hydrodynamic bearing surface 227 being opposed to the first alignment member 57, is adsorption-retained by the sleeve retainer 51a (Step S12). At the same time, the sleeve housing 222, with its endface along the flange portion 224 being abutted against the second holding platform 523, is retained by the sleeve-housing retainer 52a (Step S13).

Once the sleeve 221 and the sleeve housing 222 have been retained, the sleeve retainer 51a and the second alignment member 58 are drawn close to the sleeve-housing retainer 52a by means of the shifting mechanism 53, whereby insertion of the sleeve 221 into the sleeve housing 222 is begun (Step S14). Therein, the sleeve 221 is inserted inside the sleeve housing 222 from the second-hydrodynamic-bearing-surface 227 side of the sleeve 221.

The second hydrodynamic bearing surface 227 of the sleeve 221, having been inserted inside the sleeve housing 222, presently abuts on the surface ("first abutment surface" hereinafter) 571 of the first alignment member 57 on the side thereof that faces the sleeve-retainer 51a. Then, attendant on the movement of the support plate 531, the coil spring 513 of the sleeve retainer 51a is pressed upon by the first alignment member 57 via the sleeve 221 and the first holding platform 512, whereby the coil spring 513 elastically deforms and the second hydrodynamic bearing surface 227 of the sleeve 221 is urged along the center axis J1 in the direction toward the first abutment surface 571 of the first alignment member 57.

Meanwhile, before and after abutment of the sleeve 221 on the first alignment member 57, along the engagement part 224a of the sleeve housing 222 the surface that is directed opposite, in terms of the center axis J1, from the direction toward sleeve-housing retainer 52a (i.e., the annular surface whose width in a plane perpendicular to the center axis J1 is extremely slight) abuts on the endface 582 of the second alignment member 58 (termed "second abutment surface 582" hereinafter). Then, attendant on the movement of the support plate 531, the coil spring 524 of the sleeve-housing retainer 52a is pressed upon by the second alignment member 58 via the sleeve housing 222 and the second holding platform 523, whereby the coil spring 524 elastically deforms and the engagement part 224a of the sleeve housing 222 is urged along the center axis J1 in the direction toward the second abutment surface 582 of the second alignment member 58.

Figure 12:
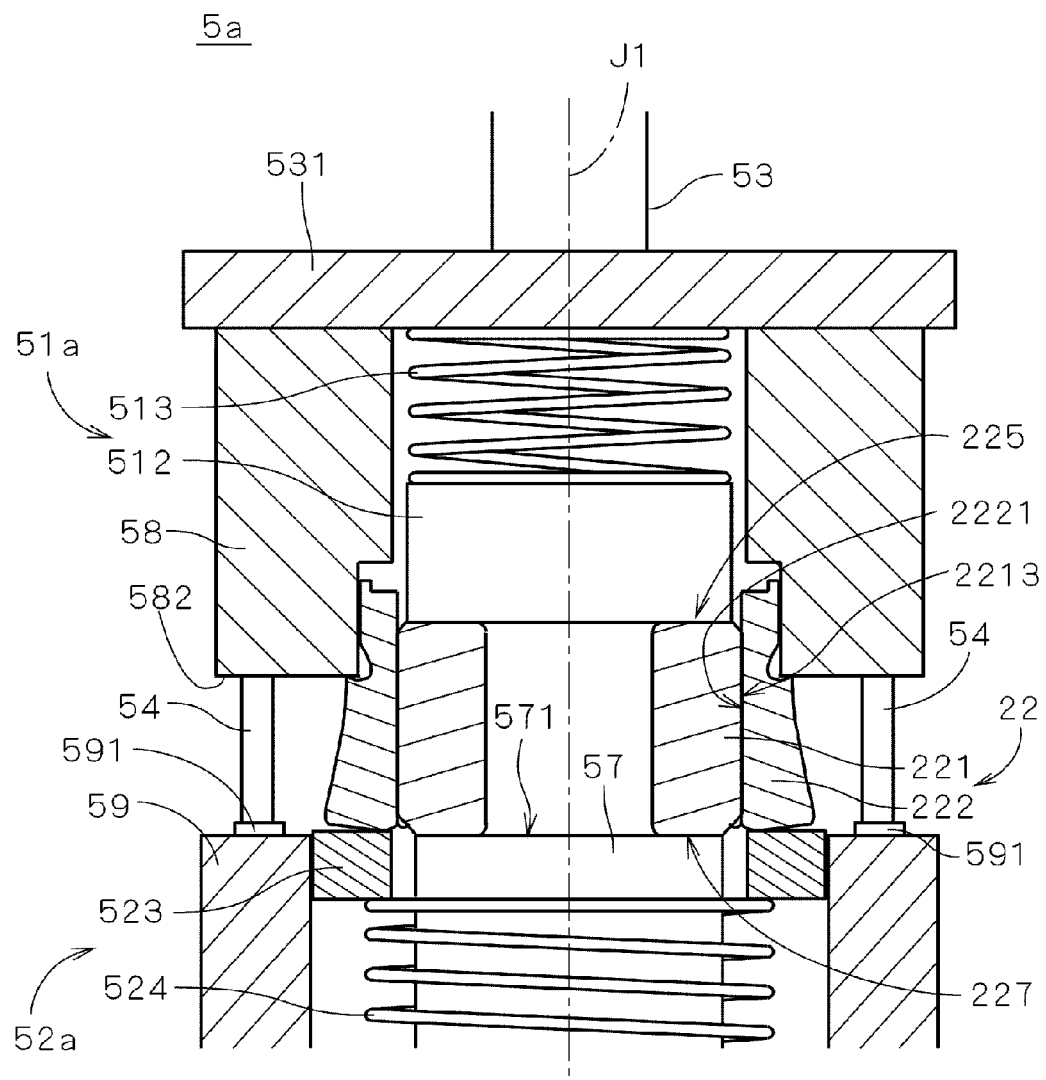
FIG. 12 is a sectional view further illustrating the sleeve-unit manufacturing device of FIG. 11.

In the sleeve-unit manufacturing device 5a, as indicated in FIG. 12, by the fore ends of the travel restrictors 54 abutting on restrictor seats 591 provided atop the cylinder member 59, the movement of the sleeve retainer 51a and the second alignment member 58 is restricted, halting the insertion of the sleeve 221 into the sleeve housing 222 (Step S15).

In the sleeve-unit manufacturing device 5a, the length of the travel restrictors 54 along the center axis J1 is defined so that the movement of the support plate 531 will be restricted when the separation, in regard to the center axis J1 orientation, between the first abutment surface 571 of the first alignment member 57 and the second abutment surface 582 of the second alignment member 58 has become equal to the designed measurement predetermined for the motor 1.

Once the movement of the sleeve retainer 51a and the second alignment member 58 has been restricted, in the same way as in Embodiment 1, the FIG. 12 state is maintained for a predetermined time period (for example, 2 minutes), and the anaerobic adhesive, whose contact with external air in the interval between the outer-side surface 2213 of the sleeve 221 and the inner-side surface 2221 of the sleeve housing 222 is cut off, cures to anchor (adhere) the sleeve 221 to the inner-side surface 2221 of the sleeve housing 222 (Step S16).

In the sleeve unit 22 of FIG. 12 also, similar to the sleeve unit 22 of FIG. 3, the adhesive 220 that is pressed out toward the second hydrodynamic bearing surface 227 by the insertion of the sleeve 221 into the sleeve housing 222 is accommodated along the outer edge of the second hydrodynamic bearing surface 227 in the recess 223 (cf. FIG. 3) formed in between the first sleeve inclined surface 2211 of the sleeve 221, and the inner-side surface 2221 of the sleeve housing 222. Then, the portion of the adhesive 220 that is accommodated in the recess 223 is cured by exposure to ultraviolet rays or other radiation, whereupon the manufacture of the sleeve unit 22 is finished (Step S17).

As explained above, in the manufacture of the sleeve unit 22 of FIG. 10, when the sleeve 221 is inserted inside and glued to the sleeve housing 222, the endface 227 of the sleeve 221 (the bottom-side endface 227 in FIGS. 11 and 12) is spring-biased in the direction toward the first abutment surface 571 of the first alignment member 57 while abutting on the first abutment surface 571. Meanwhile, along the engagement part 224a of the sleeve housing 222, the annular surface facing opposite of the way the endface 227 of the sleeve 221 faces in the center axis J1 orientation is spring-biased in the direction toward the second abutment surface 582 of the second alignment member 58 while abutting on the abutment surface 582.

Accordingly, as the sleeve 221 is glued to the inner-side surface of the sleeve housing 222, this retainment configuration of the sleeve-unit manufacturing device 5a sustains the position, with respect to the first alignment member 57, of the endface 227 of the sleeve 221, and the position, with respect to the second alignment member 58, of the annular surface along the engagement part 224a of the sleeve housing 222, whereby opportune manufacturing of the sleeve unit 22 is realized. Furthermore, during the adhesion process, the separation along the center axis J1 between the first alignment member 57 and the second alignment member 58 is kept constant by the travel restrictors 54, whereby when the sleeve unit 22 is being anchored to the baseplate 21, the separation along the center axis J1 between the annular surface of the engagement part 224a—which also is a gauging surface—and the endface 227 of the sleeve 221 on its top side is made uniform, making it possible to minimize variations in the center-axis J1 oriented separation between the baseplate 21 and the circular plate section 312 of the rotor hub 31.

In the manufacture of the sleeve unit 22, because the sleeve 221 is inserted into the sleeve housing 222 from the side opposite from the sleeve's first hydrodynamic bearing surface 225, the adhesive 220 can be prevented from sticking to the first hydrodynamic bearing surface 225. What is more, with the sleeve upper rim of the sleeve 221 in FIG. 10 being a chamfered confirmation, the recess 223 (cf. FIG. 3) that accommodates adhesive 220 pressed out by the insertion of the sleeve 221 is formed, whereby the adhesive 220 is prevented from sticking to the second hydrodynamic bearing surface 227. As a result, the quality of motors having a sleeve unit 22 in which both endfaces are rendered hydrodynamic bearing surfaces can be made consistent. It will be appreciated that in the sleeve unit 22 of FIG. 10, a recess 223 of the same conformation as that of FIGS. 8 and 9 may be formed.

Another advantage has to do with the outer periphery of the sleeve housing 222 proximate its upper-end portion in FIG. 10 (the lower end portion in FIG. 12) being part of the area constituting an outer-side gap 45 for a taper seal in the motor hydrodynamic-bearing mechanism, wherein the upper-end portion of the sleeve housing 222 is formed thick compared with the remaining region. This conformation allows the sleeve 221 to be inserted smoothly into the sleeve housing 222 when the sleeve unit 22 is being manufactured, through the thinner-walled, lower-end portion of the sleeve housing 222 on the side opposite from its upper-end portion. The facilitated manufacturing of a sleeve unit 22 enabling the formation of a taper seal that prevents outflow of lubricating oil in the motor is thereby made possible.

While embodiments of the present invention have been described in the foregoing, the present invention is not limited to the embodiments detailed above, in that various modifications are possible.

In Embodiment 2, in the manufacture of the sleeve unit 22, the endface 227 on the upper side of the sleeve 221, and the surface along the engagement part 224a of the sleeve housing 222—the annular surface facing opposite from the direction toward the endface 227 of the sleeve 221—are each gauging surfaces for alignment. Not being thereby limited, the sleeve unit 22 may be manufactured with, at the end portion of the sleeve housing 222 on the side opposite from its flange portion 224, the surface that in terms of the center-axis J1 orientation abuts on the sealing cap 23 being a gauging surface, for example, instead of the annular surface on the engagement part 224a.

Another alternative is that one of the endfaces of the sleeve along its center axis J1 orientation may be an inclined surface sloping in the direction from the inner circumferential side toward the outer circumferential side, in which case part of the inclined surface may serve as an alignment gauge. Depending on the design of the motor, the inclined surface may be a hydrodynamic bearing surface.

As described in the foregoing, when the outer-side surface of the sleeve 221 is being glued to the inner-side surface of the sleeve housing 222, it is essential that, with the sleeve 221 having been inserted inside the sleeve housing 222, one or the other of the end portions of the sleeve 221 along its center axis J1 orientation be abutted on one of the alignment members and at the same time urged along the center axis J1 in the direction toward that alignment member. Likewise, it is essential that the sleeve-housing 222 surface that faces in the direction, in terms of the center axis J1, opposite from the direction in which the urging force acts on the sleeve 221 be abutted against the other alignment member and at the same time urged along the center axis J1 in the direction toward that other alignment member. These conditions, preserving the position of the sleeve 221 with respect to the one alignment member, and the position of the sleeve housing 222 with respect to the other alignment member, enable the sleeve 221 to be glued satisfactorily to the inner-side surface of the sleeve housing 222 to manufacture the sleeve unit 22.

The sleeve upper rim and/or the sleeve housing brim may be of a round-beveled form whose cross-section is arcuate, or of a different beveled form having an annular inclined surface centering on the center axis J1. Furthermore, when the sleeve 221 is made of a solid material, or in other such implementations, the sleeve upper rim is formed into a chamfered conformation by a machining process to bevel the rim.

In the manufacture of a sleeve unit involving the above-described embodiments, prior to coating the adhesive 220 onto the inner-side surface 2221 of the sleeve housing 222 and/or the outer-side surface 2213 of the sleeve 221, both the inner- and outer-side surfaces may be coated with an undercoating treatment material such as a primer. The adhesive strength and the bondability between the sleeve 221 and the sleeve housing 222 in the sleeve unit is thereby improved.

Another possible modification is that in the first urging mechanism 55 and the second urging mechanism 56, instead of the first coil spring 552 and the second coil spring 562, other elastic components such as plate springs may be utilized. A further alternative is that in the first urging mechanism 55, the first urging member 551 may be pressured by an air cylinder. In that case, the compressed air functions as an elastic device that pressures the first urging member 551 against the sleeve 221.

In the sleeve-unit manufacturing device 5, the retention of the sleeve 221 by means of the sleeve retainer 51 is not limited to being by vacuum adsorption; the sleeve may be retained by electrical or magnetic adsorption, or may be retained by grasping or by other mechanical means. Furthermore, in an implementation that after insertion of the sleeve 221 inside the sleeve housing 222 allows the sleeve 221 to be retained stably by the sleeve retainer 51 until the sleeve has been fixed to the sleeve housing 222, the spring-biasing of the sleeve 221 against the first abutment surface 511 by means of the first urging mechanism 55 may be omitted.

The travel restrictors 54 in the sleeve-unit manufacturing device 5 are not necessarily limited to being columnar components sandwiched in between the sleeve retainer 51 and the sleeve-housing retainer 52, and may be, for example, the shifting mechanism 53 being controlled based on the distance between the first abutment surface 511 and the second abutment surface 521, measured by a distance-measuring device employing an encoder or a laser beam.

A motor involving the embodiments described above does not necessarily have to be a so-called inner-rotor type, in which the rotor magnet 34 is disposed to the center-axis J1 side of the stator 24, but may an outer-rotor type, in which the rotor magnet 34 is disposed to the outside of the stator 24.

Still another possible modification is that so-called gas-pressure bearings, in which air serves as the working fluid, may be utilized for the bearing mechanism. In such an implementation as well, actions and effects similar to those of the invention as described in the foregoing can be gained.

A motor involving the embodiments described above may be employed as the drive source for other devices apart from hard-disk drives—for example, disk-drive devices such as removable disk devices.

What is claimed is:

1. A method of manufacturing a sleeve unit defined by a sleeve arranged to receive a shaft of a motor including a bearing mechanism employing hydrodynamic pressure, and of a sleeve housing that fastens to the outer periphery of the sleeve, the method comprising:

a) a step of retaining a sleeve shaped essentially in the form of a cylinder centering on a center axis, and having on a first endface of the sleeve along the center axis a first hydrodynamic bearing surface;

b) a step of retaining, with the center axis as center, an essentially cylindrical sleeve housing with a second endface of the sleeve housing along the center axis being opposed to a third endface of the sleeve along the center axis, the sleeve housing having on a fourth endface thereof along the center axis a second hydrodynamic bearing surface;

c) a step of shifting, along the center axis, the sleeve relative to the sleeve housing to insert the sleeve into the sleeve housing, and making the center-axis-oriented separation between the first hydrodynamic bearing surface and the second hydrodynamic bearing surface be a predetermined distance;

d) a step, either performed simultaneously with or after said step c), of fixing the sleeve to the sleeve housing; and wherein in said step c):

the first hydrodynamic bearing surface is abutted on a first abutment surface of a sleeve retainer that retains the sleeve, and is urged in the direction toward the first abutment surface;

the second hydrodynamic bearing surface is abutted on a second abutment surface of a sleeve-housing retainer that retains the sleeve housing, and is urged in the direction toward the second abutment surface; and the center-axis-oriented separation between the first hydrodynamic bearing surface and the second hydrodynamic bearing surface is made to be the predetermined distance.

2. A sleeve-unit manufacturing method as set forth in claim 1, wherein error in the separation between the first hydrodynamic bearing surface and the second hydrodynamic bearing surface is no more than about 15 pm.

3. A sleeve-unit manufacturing method as set forth in claim 1, wherein the sleeve is a porous component pressure-molded from a starting material.

4. A sleeve-unit manufacturing method as set forth in claim 1, wherein error in the separation between the first hydrodynamic bearing surface and the second hydrodynamic bearing surface is no more than about 15 pm.

5. A sleeve-unit manufacturing method as set forth in claim 1, wherein the sleeve is a porous component pressure-molded from a starting material.

6. A sleeve-unit manufacturing method as set forth in claim 1, further comprising a step, prior to said step c), of applying an anaerobic adhesive onto an outer-side surface of the sleeve and/or onto an inner-side surface of the sleeve housing.

7. A method of manufacturing a sleeve unit defined by a sleeve arranged to receive a shaft of a motor including a bearing mechanism employing hydrodynamic pressure, and of a sleeve housing that fastens to the outer periphery of the sleeve, the method comprising:

a) a step of applying an adhesive to an outer-side surface of a sleeve centering on a center axis, and/or to an inner-side surface of a sleeve housing, the sleeve housing inner-side surface centering on the center axis;

b) a step of retaining the sleeve;

c) a step of retaining the sleeve housing while opposing a second end portion, in the center-axis orientation, of the sleeve housing to a third end portion of the sleeve on a side thereof opposite, in the center-axis orientation, from a first end portion of the sleeve;

d) a step of shifting, along the center axis, the sleeve relative to the sleeve housing to insert the sleeve into the sleeve housing through the other end portion of the sleeve housing, and of abutting the sleeve and the sleeve housing respectively against a first alignment member and a second alignment member and meanwhile adhering the sleeve to the inner-side surface of the sleeve housing by means of the adhesive, wherein in said step d), either the first end portion or the third end portion of the sleeve is urged along the center axis in a direction toward the first alignment member by a first urging member while also being abutted against the first alignment member, and a surface of the sleeve housing that faces a direction opposite from the direction in which the urging force applied by the first urging member acts on the sleeve is urged along the center axis in the direction toward the second alignment member while also being abutted against the second alignment member.

8. A sleeve-unit manufacturing method as set forth in claim 7, wherein a hydrodynamic bearing surface is formed on the first end portion of the sleeve.

9. A sleeve-unit manufacturing method as set forth in claim 7, wherein:
an outer peripheral rim of the third end portion of the sleeve, and/or an inner peripheral margin of the fourth end portion, along the center axis, of the sleeve housing includes a chamfered portion; and
in said step d) adhesive is accommodated in a recess formed by the chamfered portion which is provided between the sleeve and the sleeve housing.

10. A sleeve-unit manufacturing method as set forth in claim 9, wherein:
the outer peripheral rim of the sleeve, and/or the inner peripheral margin of the sleeve housing is beveled to have an annular inclined surface centered about the center axis; and
the length of the inclined surface along the center axis is from about 0.05 mm to about 0.5 mm, while the width of the inclined surface along a direction perpendicular to the center axis is from about 0.17 times to about 2.75 times the length.

11. A sleeve-unit manufacturing method as set forth in claim 9, wherein a hydrodynamic bearing surface is formed on the first end portion of the sleeve.

12. A sleeve-unit manufacturing method as set forth in claim 9, wherein the sleeve is a porous component pressure-molded from a starting material.

13. A sleeve-unit manufacturing method as set forth in claim 12, wherein the chamfered portion is provided along the outer peripheral rim of the third end portion of the sleeve is formed at the same time that the sleeve is formed.

14. A sleeve-unit manufacturing method as set forth in claim 7, wherein the sleeve is a porous component pressure-molded from a starting material.

15. A sleeve-unit manufacturing method as set forth in claim 7, wherein a fourth end portion of the sleeve housing includes a hydrodynamic bearing surface perpendicular to the center axis.

16. A sleeve-unit manufacturing method as set forth in claim 7, wherein the third end portion of the sleeve includes a hydrodynamic bearing surface.

17. A sleeve-unit manufacturing method as set forth in claim 7, wherein the adhesive is either an anaerobic or a light-curable adhesive.

18. A method of manufacturing a sleeve unit including a sleeve arranged to receive a shaft of a motor including a bearing mechanism employing hydrodynamic pressure, and of a sleeve housing that fastens to the outer periphery of the sleeve, the method comprising:

a) a step of applying an adhesive onto an outer-side surface of a sleeve centering on a center axis, and/or onto an inner-side surface of a sleeve housing essentially in the form of a cylinder, the sleeve-housing inner-side surface centering on the center axis, wherein the sleeve housing's wall thickness in the vicinity of a second end of the sleeve housing along the center axis is thinner than its wall thickness in the vicinity of a fourth end of the sleeve housing along the center axis;

b) a step of retaining the sleeve;

c) a step of retaining the sleeve housing while opposing the second end portion of the sleeve housing to a third end portion of the sleeve on a side thereof opposite, in the center-axis orientation, from a first end portion of the sleeve;

d) a step of shifting, along the center axis, the sleeve relative to the sleeve housing to insert the sleeve into the sleeve housing through the second end portion of the sleeve housing, and of abutting the sleeve and the sleeve housing respectively against a first alignment member and a second alignment member and meanwhile adhering the sleeve to the inner-side surface of the sleeve housing by through the adhesive, wherein in said step d), either the first end portion or the third end portion of the sleeve is urged along the center axis in a direction toward the first alignment member by a first urging member while also being abutted against the first alignment member, and a surface of the sleeve housing that faces a direction opposite from the direction in which the urging force applied by the first urging member acts on the sleeve is urged along the center axis in the direction toward the second alignment member while also being abutted against the second alignment member.

19. A sleeve-unit manufacturing method as set forth in claim 18, wherein:
an outer peripheral rim of the third end portion of the sleeve, and/or an inner peripheral margin of the fourth end portion, along the center axis, of the sleeve housing includes a chamfered portion; and
in said step d) adhesive is accommodated in a recess formed by the chamfered portion which is provided between the sleeve and the sleeve housing.

20. A sleeve-unit manufacturing method as set forth in claim 19, wherein:
the outer peripheral rim of the sleeve, and/or the inner peripheral margin of the sleeve housing is beveled to have an annular inclined surface centered on the center axis; and
the length of the inclined surface along the center axis is from about 0.05 mm to about 0.5 mm, while the width of the inclined surface along a direction perpendicular to the center axis is from about 0.17 times to about 2.75 times the length.

21. A sleeve-unit manufacturing method as set forth in claim 19, wherein the sleeve is a porous component pressure-molded from a starting material.

22. A sleeve-unit manufacturing method as set forth in claim 21, wherein the chamfered portion is provided along the outer peripheral rim of the third end portion of the sleeve is formed at the same time that the sleeve is formed.

23. A sleeve-unit manufacturing method as set forth in claim 18, wherein the third end portion of the sleeve includes a hydrodynamic bearing surface.

24. A sleeve-unit manufacturing method as set forth in claim 18, wherein the outer periphery of the sleeve housing proximate the fourth end portion is a portion of an area defining a gap arranged to provide a taper seal in the hydrodynamic bearing mechanism.

25. A sleeve-unit manufacturing method as set forth in claim 18, wherein the sleeve housing is installed in a baseplate of the motor stator unit adjacent to the second end portion.

* * * * *